(12) United States Patent
Miksovsky et al.

(10) Patent No.: US 12,478,200 B2
(45) Date of Patent: *Nov. 25, 2025

(54) EATING UTENSIL

(71) Applicant: humangear, Inc., San Francisco, CA (US)

(72) Inventors: Christopher A. Miksovsky, Bend, OR (US); Clint N. Slone, San Francisco, CA (US); Evelyne Chaubert, San Francisco, CA (US); Charlie Nghiem, Oakland, CA (US); Robert Charles Lane, Belmont, CA (US); Jonathan Paul Downing, Belmont, CA (US)

(73) Assignee: humangear, Inc., San Francisco, CA (US)

( * ) Notice: Subject to any disclaimer, the term of this patent is extended or adjusted under 35 U.S.C. 154(b) by 446 days.

This patent is subject to a terminal disclaimer.

(21) Appl. No.: 17/993,353

(22) Filed: Nov. 23, 2022

(65) Prior Publication Data

US 2023/0090325 A1    Mar. 23, 2023

Related U.S. Application Data

(60) Continuation of application No. 16/725,397, filed on Dec. 23, 2019, now Pat. No. 11,540,654, which is a
(Continued)

(51) Int. Cl.
*A47G 21/06* (2006.01)
*A47G 21/02* (2006.01)
*A47G 21/04* (2006.01)

(52) U.S. Cl.
CPC ........... *A47G 21/06* (2013.01); *A47G 21/023* (2013.01); *A47G 21/04* (2013.01)

(58) Field of Classification Search
CPC ...... A47G 21/02; A47G 21/023; A47G 21/04; A47G 21/06; A47G 21/08; A47J 43/28–282
(Continued)

(56) References Cited

U.S. PATENT DOCUMENTS

| 32,916 A | 7/1861 | Richards |
| 33,703 A | 11/1861 | Hardie |

(Continued)

FOREIGN PATENT DOCUMENTS

| CN | 2062986 U † | 10/1990 |
| CN | 2231889 | 7/1996 |

(Continued)

OTHER PUBLICATIONS

Alite, Cloverware Lite, http://shop.alitedesigns.com/cloverware-lite.html, downloaded on Mar. 6, 2014.
(Continued)

*Primary Examiner* — Jason Daniel Prone
(74) *Attorney, Agent, or Firm* — Beyer Law Group LLP

(57) ABSTRACT

An eating utensil having a fork head that includes a plurality of tines and a concave fork bowl portion is described. One or both of the outer tines include a chamfered or tapered surface that extends laterally inward from a curved outer edge of the corresponding outer tine such that the curved tine/fork head edge acts as a splitting feature. In some embodiments one or both of the curved fork head edges that act as a splitting feature is/are smooth. In some embodiments, the eating utensil is formed of a glass reinforced thermoplastic material such as a glass filled nylon.

54 Claims, 24 Drawing Sheets

Related U.S. Application Data division of application No. 16/213,466, filed on Dec. 7, 2018, now Pat. No. 10,555,629, which is a division of application No. 15/268,175, filed on Sep. 16, 2016, now abandoned, which is a division of application No. 14/204,497, filed on Mar. 11, 2014, now Pat. No. 9,468,321.

(58) Field of Classification Search
USPC ..... 30/147–150, 322–328; D7/643, 644, 653
See application file for complete search history.

(56) References Cited

U.S. PATENT DOCUMENTS

| | | | |
|---|---|---|---|
| 34,069 | A | 1/1862 | Neill |
| 34,098 | A | 1/1862 | Hardie et al. |
| 34,712 | A | 3/1862 | Cables |
| 46,832 | A | 3/1865 | Thorne |
| 88,370 | A | 3/1869 | Cox |
| RE7,925 | E | 10/1877 | Ulmer |
| RE9,687 | E | 5/1881 | Cox |
| 398,264 | A | 2/1889 | Kisner |
| D30,129 | S | 2/1899 | Whitcomb et al. |
| D31,575 | S | 10/1899 | Phillips et al. |
| 671,740 | A | 4/1901 | Wattne |
| 675,475 | A | 6/1901 | Glover |
| 812,424 | A | 2/1906 | Hellmuth |
| 849,098 | A | 4/1907 | Aufrichtig |
| 854,745 | A | 5/1907 | King |
| 870,413 | A | 11/1907 | Brown |
| 972,777 | A | 10/1910 | Richardson |
| 1,053,387 | A | 2/1913 | Hawley |
| 1,229,696 | A | 6/1917 | Woods |
| 1,271,679 | A | 7/1918 | Duckett |
| 1,277,205 | A | 8/1918 | Evans |
| D53,165 | S | 4/1919 | Janosik |
| 1,337,174 | A | 4/1920 | Whyte |
| 1,348,762 | A | 8/1920 | Suzuki |
| 1,372,325 | A | 3/1921 | Willemin |
| D59,869 | S | 11/1921 | Quandee et al. |
| D60,369 | S | 2/1922 | Quandee et al. |
| 1,425,750 | A | 8/1922 | Crawford |
| 1,452,337 | A | 4/1923 | Brecel |
| D63,047 | S | 9/1923 | Adler |
| 1,699,248 | A | 1/1929 | Pasal |
| 1,868,289 | A | 7/1932 | Leidel |
| D93,956 | S | 11/1934 | Wilson |
| 1,984,081 | A | 12/1934 | Pisculli |
| 2,010,074 | A | 8/1935 | Fuerst |
| 2,109,016 | A | 2/1938 | Ringer |
| 2,251,842 | A | 8/1941 | Hill |
| 2,318,129 | A | 5/1943 | Torode |
| D143,431 | S | 1/1946 | Lapin |
| 2,439,882 | A | 4/1948 | Beddow |
| D149,920 | S | 6/1948 | Warner |
| 2,470,492 | A | 5/1949 | Jenkins |
| 2,505,122 | A | 4/1950 | Krieger, Jr. |
| 2,542,600 | A | 2/1951 | Vaccarezza |
| 2,610,400 | A | 9/1952 | Wendling |
| 2,752,678 | A | 7/1956 | Welch |
| D184,317 | S | 1/1959 | McArthur |
| 3,014,277 | A | 12/1961 | Geckler |
| 3,121,951 | A | 2/1964 | Green |
| 3,138,871 | A | 6/1964 | Sears |
| D199,630 | S | 11/1964 | Dedic, Sr. |
| D209,704 | S | 12/1967 | Siune et al. |
| D210,549 | S | 3/1968 | O'Brien |
| 3,586,161 | A | 6/1971 | Fong et al. |
| 3,596,965 | A | 8/1971 | Woofter |
| 3,630,249 | A | 12/1971 | Brunwin |
| 3,771,224 | A | 11/1973 | Bono, Jr. |
| 3,967,376 | A | 7/1976 | Foley |
| D241,302 | S | 9/1976 | Scigliano |
| 3,991,466 | A | 11/1976 | Smith |
| D249,926 | S | 10/1978 | Wong |
| 4,317,284 | A | 3/1982 | Prindle |
| 4,377,035 | A | 3/1983 | Dalichow |
| D269,060 | S | 5/1983 | Creamer |
| 4,425,711 | A | 1/1984 | Wood et al. |
| 4,524,512 | A | 6/1985 | Formo et al. |
| 4,535,538 | A † | 8/1985 | Nelson |
| D284,442 | S | 7/1986 | Chan |
| 4,615,120 | A | 10/1986 | Newman |
| 4,625,404 | A | 12/1986 | Valente et al. |
| 4,771,541 | A | 9/1988 | Bouchakian |
| 4,835,864 | A | 6/1989 | Tang |
| 4,984,367 | A | 1/1991 | Albanese |
| 4,995,154 | A | 2/1991 | Bamber |
| D318,600 | S | 7/1991 | Lillelund et al. |
| D325,855 | S | 5/1992 | Rea, Sr. |
| 5,197,623 | A | 3/1993 | Wang |
| D342,422 | S | 12/1993 | Sanford |
| D347,975 | S | 6/1994 | Zeller |
| 5,327,650 | A | 7/1994 | Rojas |
| D362,160 | S | 9/1995 | Brabeck et al. |
| 5,542,181 | A | 8/1996 | Gaylord |
| D376,514 | S | 12/1996 | Torkelson |
| D388,664 | S | 1/1998 | Gagnon et al. |
| D391,123 | S | 2/1998 | Rey et al. |
| 5,735,050 | A | 4/1998 | Hsieh |
| D396,613 | S | 8/1998 | Cousins |
| D401,481 | S | 11/1998 | Boilard et al. |
| 5,845,403 | A | 12/1998 | Nivin |
| 5,904,250 | A | 5/1999 | De Schutter |
| D412,813 | S | 8/1999 | Roskind et al. |
| 5,940,974 | A | 8/1999 | Lee |
| D414,988 | S | 10/1999 | Santini |
| 6,055,733 | A | 5/2000 | Chen |
| 6,145,204 | A | 11/2000 | Cash |
| 6,151,999 | A | 11/2000 | Eklind |
| 6,374,500 | B2 | 4/2002 | Stein et al. |
| 6,463,662 | B1 | 10/2002 | Coscia et al. |
| 6,647,828 | B2 | 11/2003 | Hakim |
| D491,419 | S | 6/2004 | White et al. |
| D509,708 | S | 9/2005 | Schmidt |
| 7,013,568 | B2 | 3/2006 | Schmidt |
| D530,985 | S | 10/2006 | Evans |
| D530,986 | S | 10/2006 | Lago-Arenas |
| D533,034 | S | 12/2006 | Wasserman |
| D535,857 | S | 1/2007 | Bristow |
| D536,221 | S | 2/2007 | Kamins |
| D536,222 | S | 2/2007 | Heiberg et al. |
| D537,302 | S | 2/2007 | Vrhovski |
| D554,951 | S | 11/2007 | McGrath |
| D563,737 | S | 3/2008 | Shane-Schuldt |
| D575,593 | S | 8/2008 | Svartström |
| D587,075 | S | 2/2009 | Dibnah et al. |
| D608,602 | S | 1/2010 | Davies et al. |
| D609,060 | S | 2/2010 | Pallotto |
| D612,692 | S | 3/2010 | Menceles |
| D617,156 | S | 6/2010 | Griffith |
| D618,070 | S | 6/2010 | Jalet et al. |
| D625,153 | S | 10/2010 | Gallop et al. |
| 7,816,634 | B1 | 10/2010 | Guide, Jr. et al. |
| 7,856,722 | B2 | 12/2010 | Lago-Arenas |
| D633,344 | S | 3/2011 | Nordwall |
| D637,309 | S | 5/2011 | Park |
| D656,799 | S | 4/2012 | Lebeau |
| 8,296,957 | B2 | 10/2012 | Muehlemann |
| D673,431 | S | 1/2013 | Glavin et al. |
| D676,286 | S | 2/2013 | Lion et al. |
| D686,045 | S | 7/2013 | Stewart et al. |
| D690,156 | S | 9/2013 | Apple et al. |
| 8,635,780 | B1 | 1/2014 | Abul |
| 8,689,453 | B2 | 4/2014 | Vogan |
| D705,020 | S | 5/2014 | Fraser et al. |
| 8,726,525 | B2 | 5/2014 | Bagley et al. |
| D706,586 | S | 6/2014 | Kestenbaum |
| 8,839,522 | B2 | 9/2014 | Walters |
| D718,093 | S | 11/2014 | Miksovsky et al. |
| D722,837 | S | 2/2015 | Miksovsky et al. |
| D730,049 | S | 5/2015 | Miksovsky et al. |
| 9,061,429 | B2 | 6/2015 | Barber |
| D739,685 | S | 9/2015 | Miksovsky et al. |

(56) References Cited

U.S. PATENT DOCUMENTS

| | | | |
|---|---|---|---|
| D740,079 S | 10/2015 | Miksovsky et al. |
| D745,339 S | 12/2015 | Cetti |
| D746,644 S | 1/2016 | Cai |
| D747,159 S | 1/2016 | Frost |
| D752,918 S | 4/2016 | Katopis |
| D753,447 S | 4/2016 | Busboom |
| D756,171 S | 5/2016 | Mou |
| D756,172 S | 5/2016 | Mou |
| D758,808 S | 6/2016 | Gatewood |
| 9,434,590 B2 | 9/2016 | Miksovsky et al. |
| 9,468,321 B2 | 10/2016 | Miksovsky et al. |
| 9,549,626 B2 | 1/2017 | Truog et al. |
| D782,254 S | 3/2017 | Joseph |
| D794,400 S | 8/2017 | Young |
| D807,127 S | 1/2018 | Levi |
| D812,994 S | 3/2018 | Mundhra |
| D812,995 S | 3/2018 | Mundhra |
| D813,616 S | 3/2018 | Mundhra |
| D816,432 S | 5/2018 | Huang |
| D825,104 S | 8/2018 | Simard et al. |
| D828,730 S | 9/2018 | Gauss et al. |
| D834,887 S | 12/2018 | Miksovsky et al. |
| D842,662 S | 3/2019 | Bloch et al. |
| D845,085 S | 4/2019 | Miksovsky et al. |
| D862,996 S | 10/2019 | Miksovsky et al. |
| D862,997 S | 10/2019 | Miksovsky et al. |
| 10,518,402 B1 | 12/2019 | Polen |
| D873,094 S | 1/2020 | Bloch |
| 10,555,629 B2 | 2/2020 | Miksovsky et al. |
| 10,568,447 B2 | 2/2020 | Miksovsky et al. |
| D882,350 S | 4/2020 | Rubenson et al. |
| 10,857,661 B2 | 12/2020 | Miksovsky et al. |
| D909,821 S | 2/2021 | Frazee et al. |
| D910,386 S | 2/2021 | Pontano et al. |
| 2003/0024126 A1 | 2/2003 | Liu |
| 2003/0029044 A1 | 2/2003 | Mattson et al. |
| 2003/0110644 A1 | 6/2003 | Miller |
| 2005/0066531 A1 | 3/2005 | Hougland |
| 2005/0155229 A1 | 7/2005 | Lee |
| 2006/0248732 A1 | 11/2006 | Straube |
| 2007/0084063 A1 | 4/2007 | Hughes |
| 2007/0124943 A1 | 6/2007 | Hougland |
| 2007/0251103 A1 | 11/2007 | Rhodes, III |
| 2008/0000092 A1 | 1/2008 | Vanguard |
| 2008/0016698 A1 | 1/2008 | Simpson |
| 2008/0148575 A1 | 6/2008 | Chan |
| 2008/0201959 A1† | 8/2008 | Kent |
| 2008/0256807 A1 | 10/2008 | Kirkup |
| 2009/0172949 A1 | 7/2009 | Watts |
| 2009/0178284 A1 | 7/2009 | Lane |
| 2009/0205209 A1 | 8/2009 | Tovar |
| 2009/0293283 A1 | 12/2009 | Hsu |
| 2010/0206885 A1 | 8/2010 | Bowden et al. |
| 2010/0218382 A1 | 9/2010 | Scott |
| 2011/0091521 A1 | 4/2011 | Omelchenko |
| 2012/0036724 A1 | 2/2012 | Walters |
| 2012/0297628 A1 | 11/2012 | Rayko et al. |
| 2013/0152406 A1 | 6/2013 | McFarland |
| 2014/0026425 A1 | 1/2014 | Kim |
| 2015/0014329 A1 | 1/2015 | Konopatsky |
| 2015/0257562 A1 | 9/2015 | Miksovsky et al. |
| 2017/0000276 A1 | 1/2017 | Miksovsky et al. |
| 2017/0208976 A1 | 7/2017 | Muise et al. |
| 2019/0104873 A1 | 4/2019 | Miksovsky et al. |
| 2019/0110620 A1 | 4/2019 | Miksovsky et al. |
| 2019/0381651 A1 | 12/2019 | Miksovsky et al. |
| 2020/0022674 A1 | 1/2020 | Egorov |
| 2020/0128984 A1 | 4/2020 | Miksovsky |
| 2020/0383506 A1 | 12/2020 | Rubenson et al. |
| 2021/0022531 A1 | 1/2021 | Forkan |
| 2021/0045555 A1 | 2/2021 | Green |
| 2022/0022674 A1 | 1/2022 | Chuang |

FOREIGN PATENT DOCUMENTS

| | | |
|---|---|---|
| CN | 2373000 | 4/2000 |
| CN | 200945058 | 9/2007 |
| CN | 201691585 | 1/2011 |
| CN | 102068177 | 5/2011 |
| CN | 202234496 | 5/2012 |
| CN | 202874843 | 4/2013 |
| CN | 103504965 | 1/2014 |
| CN | 203424719 | 2/2014 |
| DE | 44 17 037 | 12/1998 |
| EP | 0 129 495 | 12/1984 |
| GB | 22788 | 9/1915 |
| GB | 1337613 | 11/1973 |
| JP | 2006-247086 | 9/2006 |
| WO | WO 2013/095407 | 6/2013 |
| WO | WO 2015/138218 | 9/2015 |

OTHER PUBLICATIONS

Alite, Cloverware 2.0, http://shop.alitedesigns.com/cloverware-538.html, downloaded on Mar. 6, 2014.

Guyot, Microbites™, https://www.guyotdesigns.com/product-microbites/, downloaded on Mar. 6, 2014.

Guyot, Utensils, https://www.guyotdesigns.com/utensils/, downloaded on Mar. 6, 2014.

International Search Report dated Jul. 8, 2015 from International Application No. PCT/US2015/019017.

Written Opinion dated Jul. 8, 2015 from International Application No. PCT/US2015/019017.

Chinese Office Action dated Apr. 27, 2017 from Chinese Application No. 201580022197.1.

Chinese Office Action dated Aug. 1, 2017 from Chinese Application No. 201611163525.2.

European Search Report dated Jun. 16, 2017 from European Application No. 16202786.3-1653.

European Office Action dated Oct. 17, 2018 from European Patent Application No. 16 202 786.6-1011.

Light My Fire, Spork original, http://www.lightmyfire.com/products/products/spork/spork-original.aspx, downloaded on Mar. 6, 2014.

Primus, Folding Spork, http://store.primuscamping.com/cookware/utensils-and-accessories/primus-folding-spork-black/, downloaded on Mar. 6, 2014.

DCI, Swivel Spork & Knife Set, http://shop.dcigift.com/p/swivel-spork-knife-set, downloaded on Mar. 6, 2014.

MSR Folding Camp Utensils, https://www.msrgear.com/cookware/folding-utensils, downloaded on Sep. 20, 2018.

GSI Outdoors, Telescoping Foon, http://www.gsioutdoors.com/telescoping-foon.html, downloaded on Sep. 20, 2018.

GSI Outdoors, Pivot Spatula, http://www.gsioutdoors.com/pivot-spatula.html, downloaded on Sep. 20, 2018.

Chinese Office Action dated Aug. 2, 2019 from Chinese Application No. 201810024557.7.

Extended European Search Report dated Oct. 22, 2019 from European Application No. 18208165.3-1011/3488740.

European Office Action dated Mar. 5, 2020 from European Application No. 16 202 786.6-1011.

Screenshot of Wildo product from the Internet Archive dated Feb. 24, 2012 and downloaded from the internet on Jul. 13, 2022, https://web.archive.org/web/20120224230642/http:/www.wildo.se:80/.

EU Design Registration No. 001805383-0001, Anders Kristiansson, published on Jan. 18, 2011, accessed via the EUIPO Office on Jun. 30, 2023.†

Charles-Francois Languedocq Fork ("CFL Fork") in "French Silver Cutlery of the XIXth Century", David Allan (Faton), p. 84 (Dec. 13, 2007).†

† cited by third party

EATING UTENSIL

CROSS-REFERENCE TO RELATED APPLICATIONS

This application is a Continuation of U.S. application Ser. No. 16/725,397 (now U.S. Pat. No. 11,50,654, issued Jan. 3, 2023) filed on Dec. 23, 2019, which is a Divisional of U.S. application Ser. No. 16/213,466, filed on Dec. 7, 2018 (now U.S. Pat. No. 10,555,629), which is a Divisional of U.S. application Ser. No. 15/268,175, filed on Sep. 16, 2016. U.S. application Ser. No. 15/268,175 is a Divisional of U.S. application Ser. No. 14/204,497, filed on Mar. 11, 2014 (now U.S. Pat. No. 9,468,321), which is related to U.S. Design application Ser. No. 29/484,447, filed on Mar. 10, 2014, all of which are incorporated herein by reference in their entirety.

BACKGROUND OF THE INVENTION

The present invention relates generally to eating utensils. More particularly, the invention relates to combination eating utensils that may be suitable for transport.

Eating utensils are used by people all over the world to bring food to their mouths. Sometimes, eating utensils, such as knives, are used to cut food to a size and shape suitable for placing in a person's mouth. In some Asian countries, chopsticks are typically the only eating utensils used although spoons are also used for soups in Asia. In Western countries, forks, knives, and spoons are typically used as eating utensils. In still other countries, such as India and Ethiopia, hands are often used in place of utensils.

Although these existing utensils work quite well, there are continuing efforts to develop new hybrid combinations of utensils that provide not only improved function and convenience but can also reduce the need for separate utensils. Such combination utensils are also more easily transported, as they take up less space.

SUMMARY OF THE INVENTION

In accordance with an embodiment, an eating utensil includes a fork head having a plurality of tines and a concave fork bowl portion. One or both of the outer tines include a chamfered or tapered surface that extends laterally inward from a curved outer edge of the corresponding outer tine such that the curved tine/fork head edge acts as a splitting feature. In some embodiments one or both of the curved fork head edges that act as a splitting feature is/are smooth.

In some embodiments, the eating utensil is formed of a glass reinforced thermoplastic material such as a glass filled nylon and the fork head is integrally formed with a handle.

In some embodiments, the chamfered surface extends along the corresponding outer edge of the fork head from a tip of the corresponding outer tine to the handle and tapers to a point where the handle meets the fork head, whereby the chamfered surfaces extend proximally beyond a laterally widest portion of the fork head. In some embodiments, each chamfered surface extends to a corresponding point where the handle portion meets the fork head portion.

In some embodiments, the first and second outer tines have a substantially similar size. In some embodiments, each of the outer tines has an inner surface that is substantially longitudinally in-line with the handle and root gaps between adjacent tines are fully rounded.

In some embodiments, when the eating utensil is viewed from a side with the concave fork bowl portion facing up and a visible side edge of the handle extending horizontally, a visible one of the outer edges of the fork head does not dip below the visible side edge of the handle.

In some embodiments a combination utensil is provided that has a spoon head integrally formed at the opposite end of the handle as the fork head.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

The present invention relates generally to combination eating utensils.

Referring to FIGS. 1-6, a combination spoon and fork system in accordance with one embodiment of the invention will be described. In the illustrated embodiment, the combination spoon and fork system 100 includes a spoon 110 and a fork 140 that can nest together for storage and transport. To form a single, longer combination utensil with a spoon on one end and a fork on the other end, the proximal ends of the spoon 110 and fork 140 can slide together and lock in place. A low profile interlocking mechanism is used to interlock the spoon 110 and the fork 140 in both the nested position and in the combination utensil mode. The spoon 110 and fork 140 can also be separated completely and used separately.

Figure 1A:
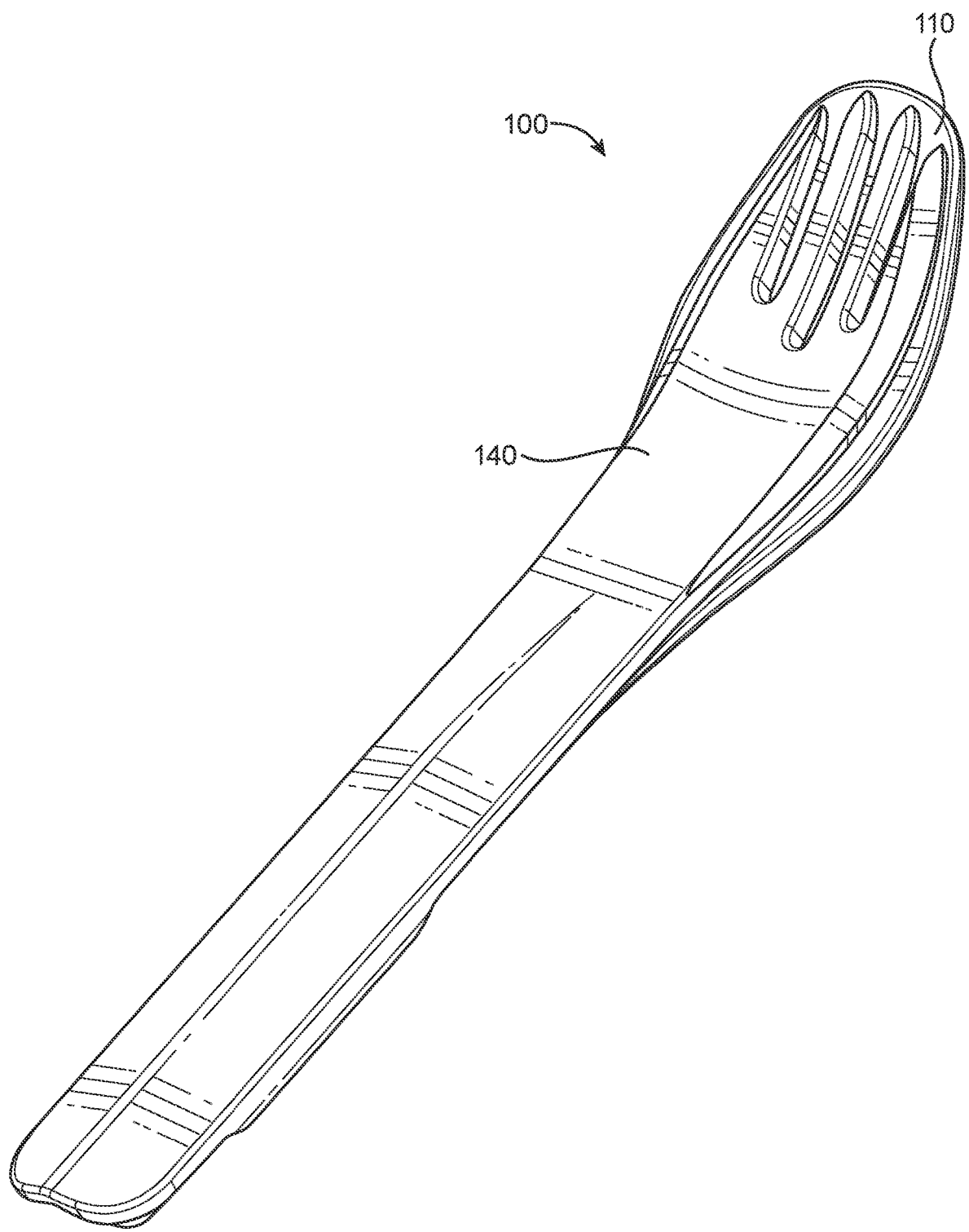
FIG. 1A is a top perspective of a combination spoon and fork system in its nested position in accordance with an embodiment.
Figure 1B:
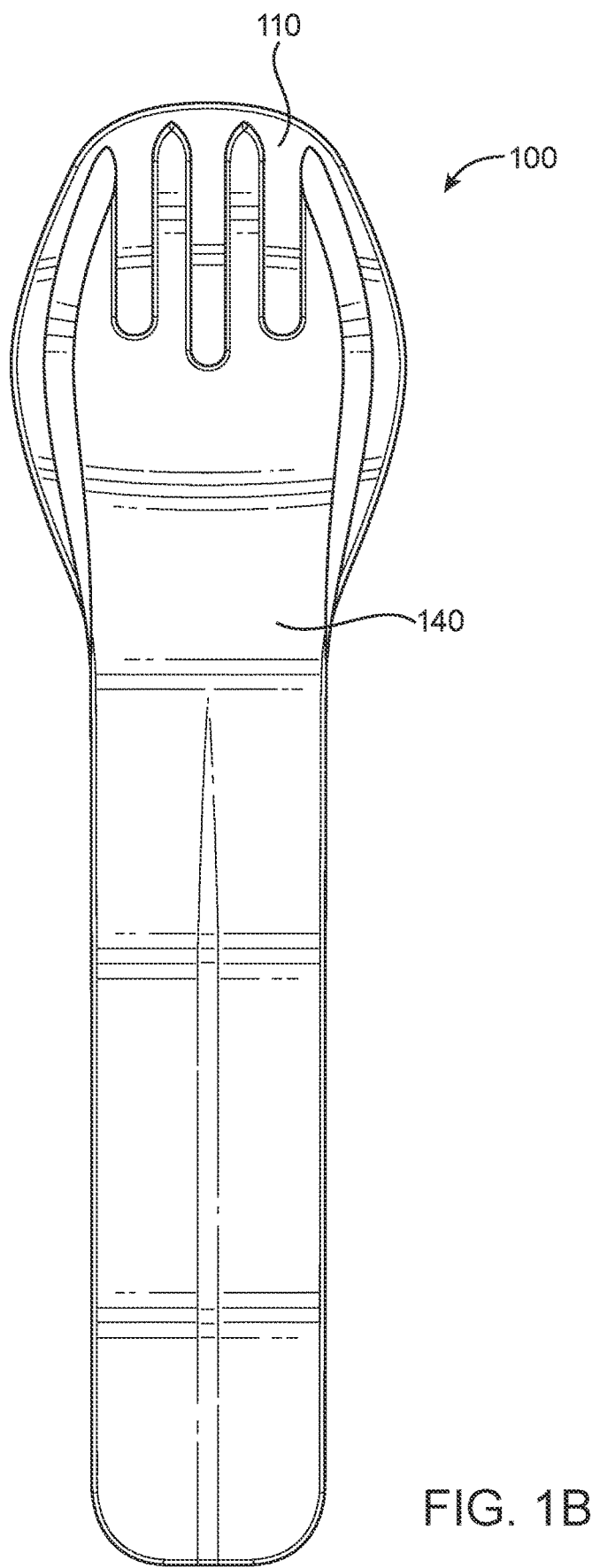
FIG. 1B is a top plan view of the combination spoon and fork system shown in FIG. 1A in its nested position.
Figure 2A:
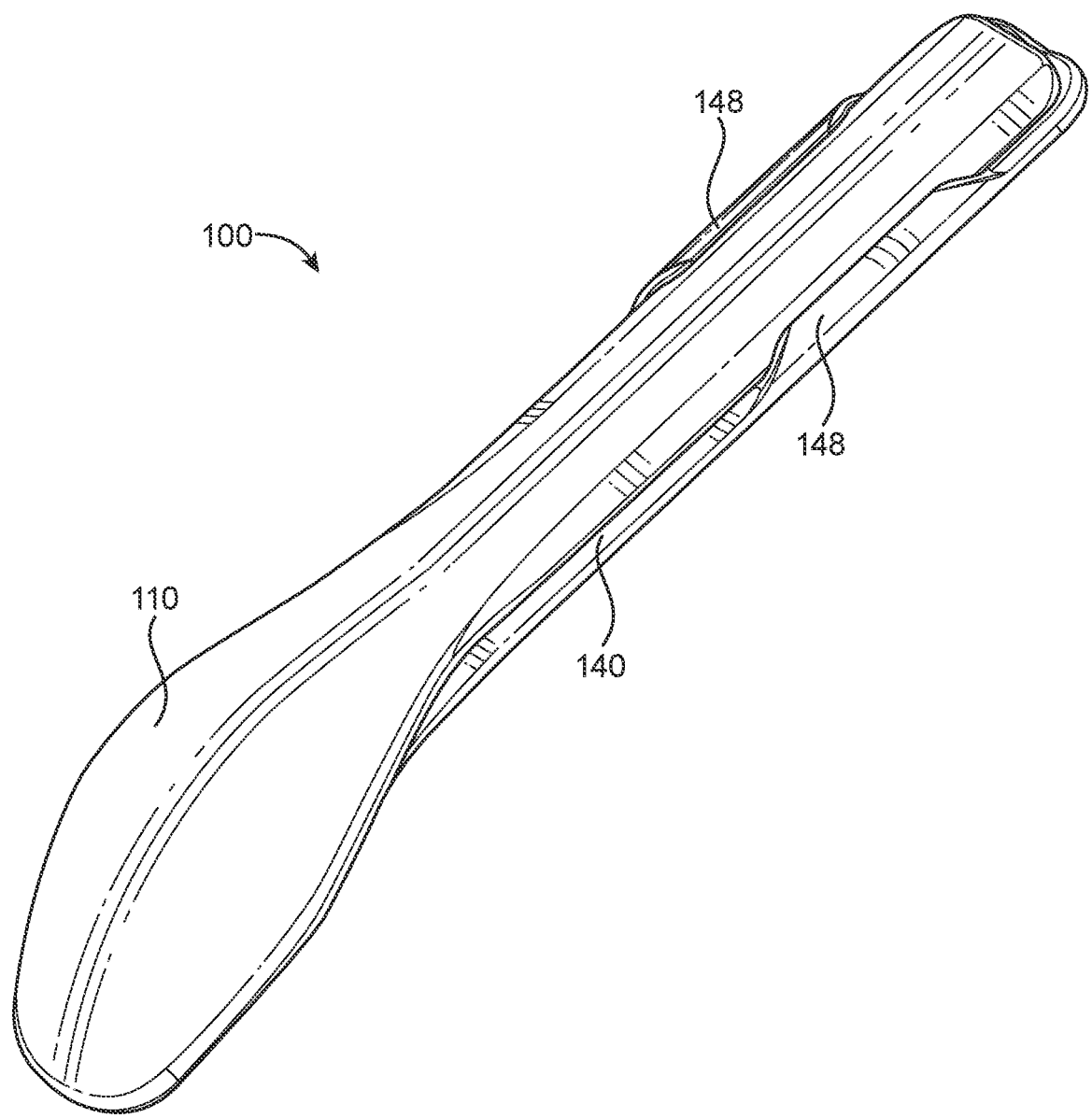
FIG. 2A is a bottom perspective view of the embodiment shown in FIG. 1 in its nested position.
Figure 2B:
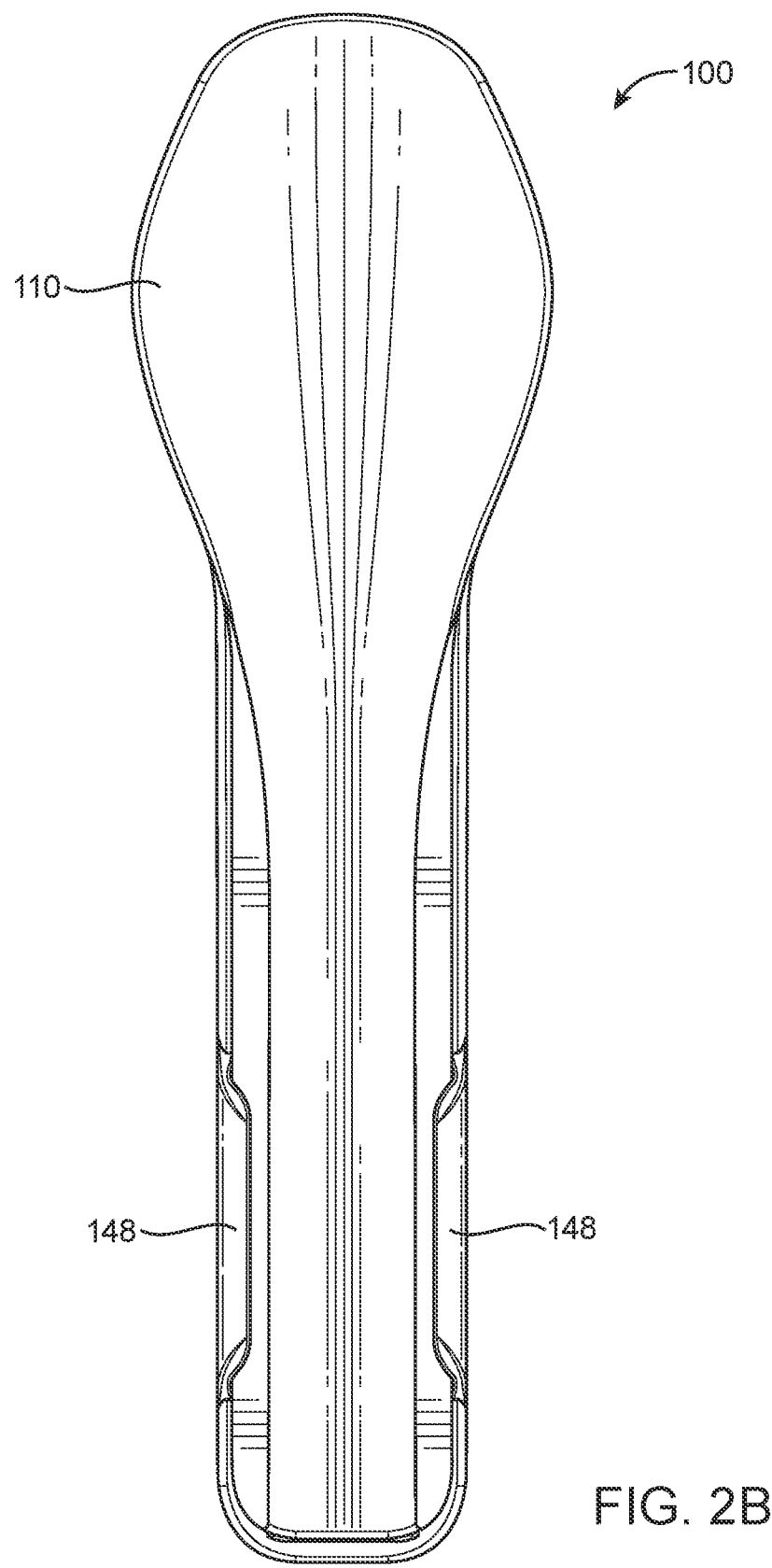
FIG. 2B is a bottom plan view of the embodiment shown in FIG. 1 in its nested position.

FIGS. 1A and 1B are top perspective and top plan views, respectively, of the combination spoon and fork system 100 in its nested position, in accordance with an embodiment. FIGS. 2A and 2B are bottom perspective and bottom plan views, respectively, of the spoon and fork system 100 in its nested position.

Figure 3:
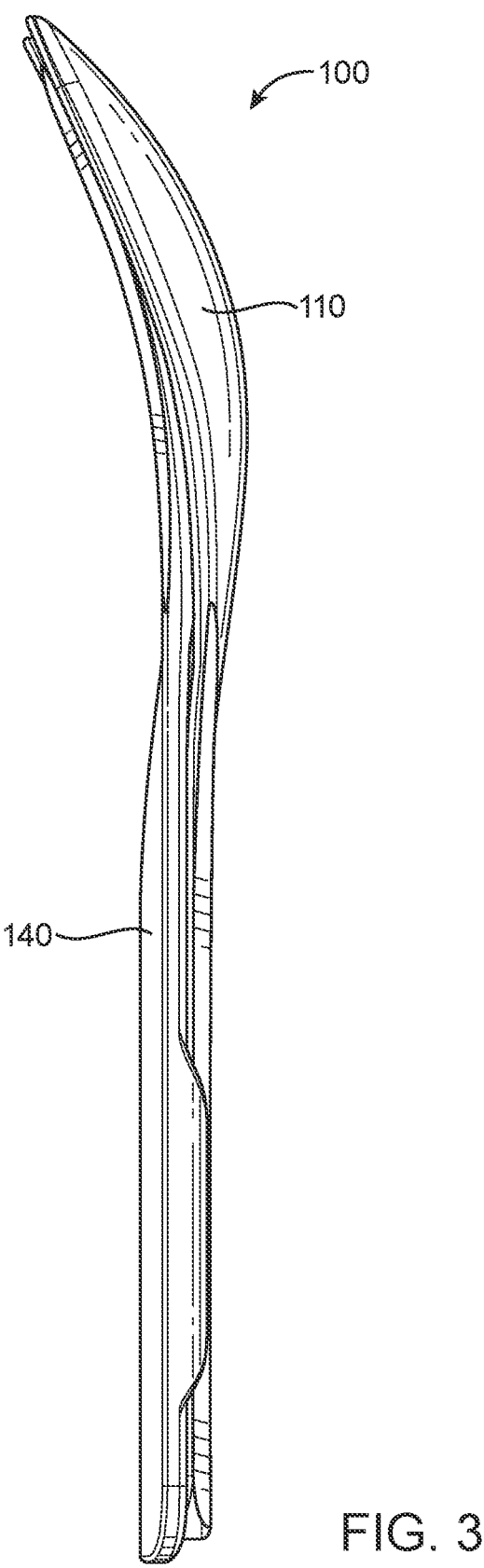
FIG. 3 is a side view of the embodiment shown in FIGS. 1 and 2.

As shown in FIGS. 1-3, the spoon 110 and fork 140 can be nested together in a low profile manner for convenient storage and transport. FIG. 3 is a side view of the combination spoon and fork system 100, which illustrates the low profile nature of the spoon and fork system 100 nested position. In the illustrated embodiment, the fork 140 is nested over the spoon 110.

Figure 4A:
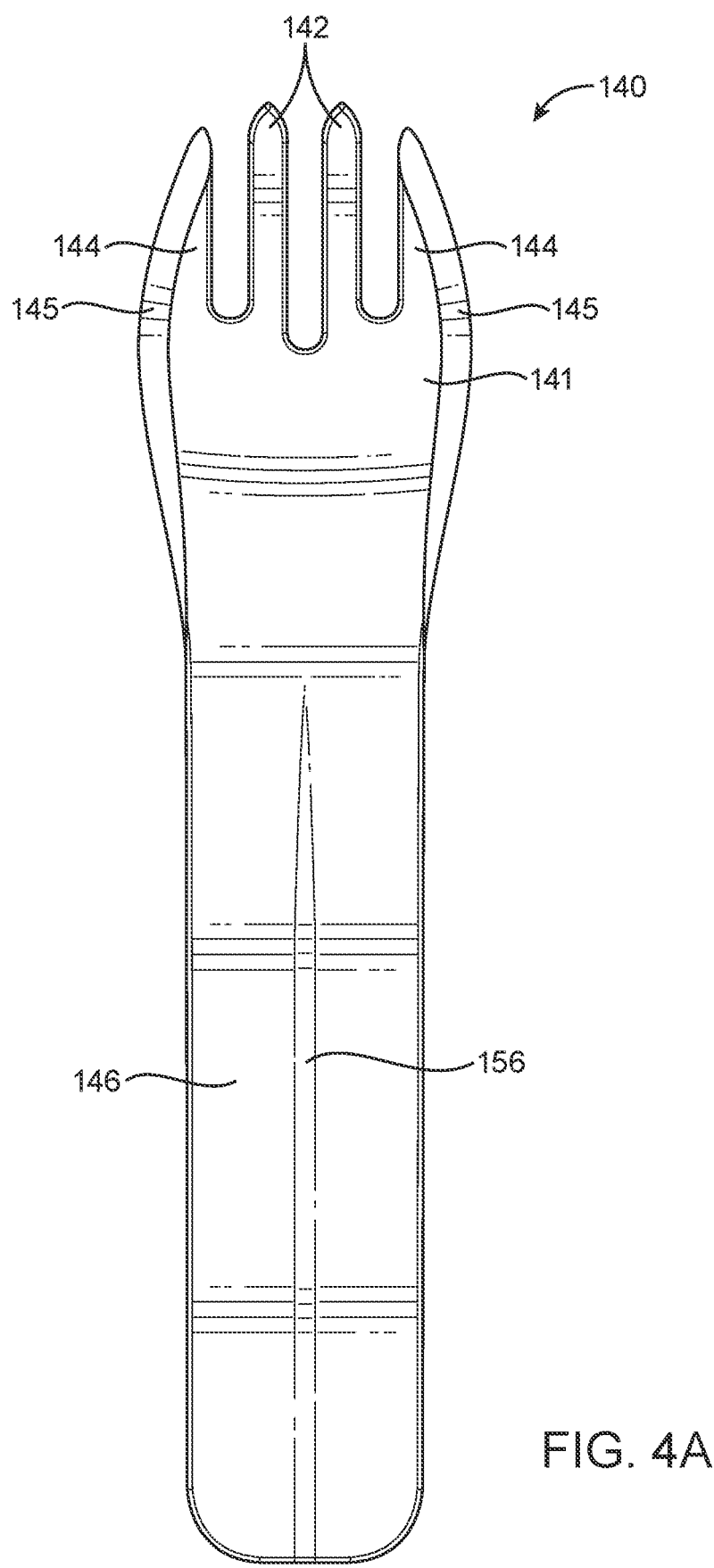
FIG. 4A is a top plan view of the fork separated from the spoon of the embodiment shown in FIGS. 1-3.
Figure 4B:
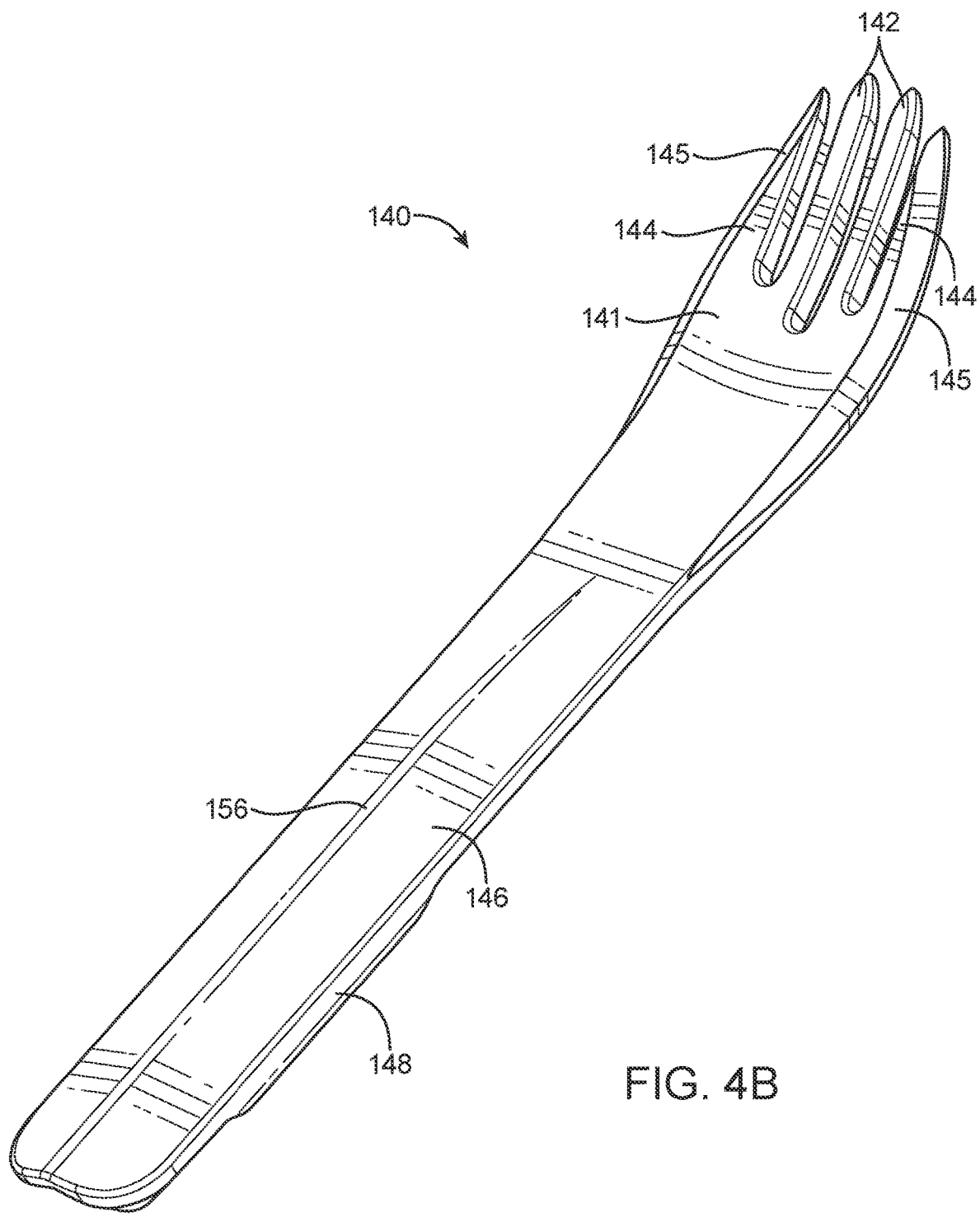
FIG. 4B is a top perspective view of the fork separated from the spoon of the embodiment shown in FIGS. 1-3.

As discussed above, the spoon 110 and the fork 140 can be separated from one another and used separately. The geometries of the fork 140 and the spoon 110 will be described below. FIGS. 4A and 4B are top plan and perspective views, respectively, of the fork 140 separated from the spoon 110. In the illustrated embodiment, the fork 140 has four tines 142, 144. It will be understood that, in other embodiments, the fork can have more or fewer tines. The fork 140 has a head portion 141, which includes the tines, that is connected to a handle 146.

Each tine 142, 144 has a sharp crest, which aids in spearing or piercing pieces of food so that the food can be picked up by the fork 140. In the illustrated embodiment, the two center tines 142 are straight and the two outer tines 144 each have a straight inner edge and a curved outer edge 145. The curved outer edges 145 of the outer tines 144 and the ends of the tines 142, 144 do not extend beyond the outer edges of the bowl portion of the spoon 110, as shown in FIGS. 1A and 1B. The curvature of the outer edges 145 can also be used for scraping food, as the curved edges 145 follow the curvature of a curved container, such as a bowl, better than the straight tines of many conventional forks.

Figure 4C:
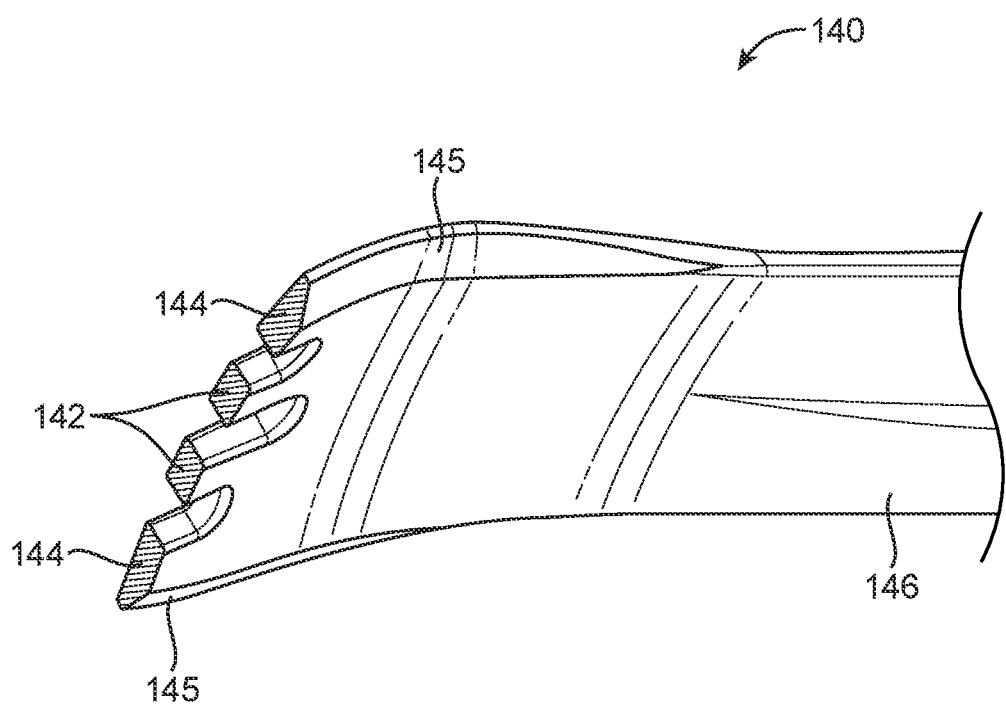
FIG. 4C is a cross-sectional perspective view of the fork shown in FIGS. 4A and 4B.

In addition to being curved, the outer edges 145 of the outer tines 144 are also tapered or chamfered such that the fork 140 can be used to cut through or separate foods that do not require a knife. The tapered or chamfered outer edges 145 are shown in the cross-sectional perspective view of FIG. 4C. As illustrated in FIG. 4C, the top surface of each of the outer edges 145 is tapered or chamfered. As illustrated, each chamfered edge 145 has one end at the tip of the outer tine 144 and extends along the outer curved edge of the outer tine 144 to the position where the fork head 141 meets the handle 146. As shown in FIGS. 4A-4C, the chamfered edge 145 spans the entire width of the outer tine 144 at the tip. As the chamfered edge 145 extends down along the curved outer edge of the outer tine 144, the width of the chamfered edge 145 remains substantially the same until it begins to taper toward the end of the fork head 141. In the illustrated embodiment, the chamfered edge 145 tapers and ends in a point where the fork head 141 meets the handle 146. Although the fork head 141 is described above as being connected to or meeting the handle 146, it will be understood that the fork is formed as an integral piece in this embodiment.

In a particular embodiment, the outer edges 145 are chamfered at an angle of about 20-25 degrees, and preferably at an angle of about 23 degrees. The outer edges 145 have an edge width of about 1 mm at its widest point. In the illustrated embodiment, the outer edges 145 of both outer tines 144 are chamfered so that both outer edges 145 can easily be used to cut or separate food regardless of whether the user is right-handed or left-handed.

In the illustrated embodiment, as shown in FIGS. 1A and 1B, a safety feature is that when the spoon 110 and fork 140 are nested, the tines 142, 144 of the fork 140 do not extend as far as the end of the spoon 110 such that the tips of the tines 142, 144 cannot poke or stab someone or something when the fork 140 and spoon 110 are in the nested position.

As shown in FIGS. 1A and 4A, the center tines 142 have a longer length than the outer tines 144 and therefore extend farther distally than the outer tines 144, thereby forming a curve at the distal end of the fork 140. The curvature of the distal end of the fork 140 can match the curvature of the distal end of the spoon 110, but as noted above, the tips of the tines 142, 144 do not extend beyond the end edge of the spoon 110 when nested. As shown in FIG. 1A, the bowl portion of the spoon 110 is slightly wider and longer than the corresponding portion of the fork 140 in the illustrated embodiment.

The handle 146 of the fork 140 will be described with reference to FIGS. 4D-4H. The handle 146 has a pair of rails 148 that extend downward from the bottom side of its two outer edges. The rails 148 aid in guiding the handle 146 of the fork 150 over the handle 114 of the spoon 110 when the spoon handle 114 is slid between the rails 148 to either place the spoon 110 and fork 140 in the nested position or slid end over end to form an elongated combination eating utensil, as will be described in more detail below. The rails 148 also secure the spoon handle 114 to the handle 146 of the fork 140, as will be explained in more detail below. As shown in the side view of FIGS. 3 and 6D, the rails 148 are very low profile, as they do not extend below the lowest bottom surface of the spoon handle 114 when the fork 140 and spoon 110 are either nested together or slid end over end to form the elongated combination eating utensil. FIGS. 2A, 2B, 6B and 6C show that, in the illustrated embodiment, the rails 148 extend only to about halfway across the width of the chamfered edge 122 of the spoon 110. The low profile nature of the rails 148 allow more efficient stacking of the fork and spoon systems 100.

The outer edge of each rails 148 is aligned and continuous with the outer edge of the rest of the fork handle 146. Further, the rails 148 taper inward so that the portion of the handle 146 with the rails 148 does not feel different from the rest of handle 146 when the fork 140 is held in a user's hand. The inward tapering as well as the low profile nature of the rails 148 reduce the tactile impact they have on a user's hand holding the fork. That is, the handle with low profile rails 148 feels better to hold than a handle having big protuberances, edges, etc.

Figure 4D:
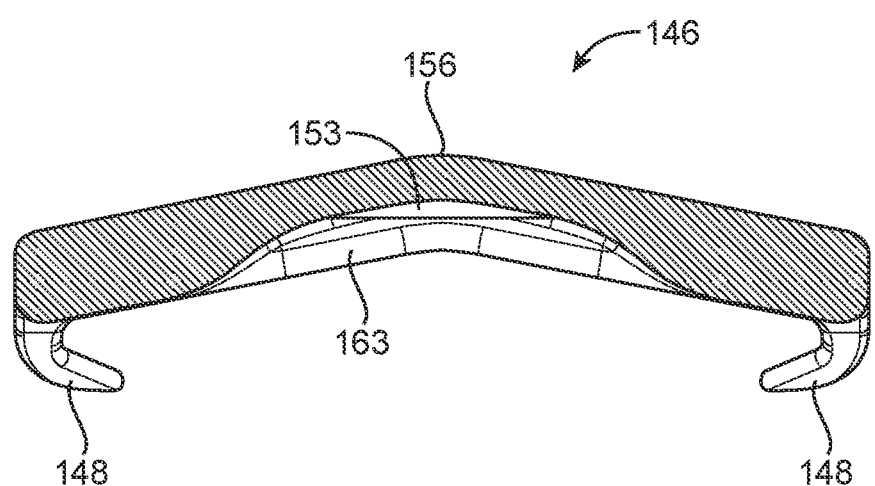
FIG. 4D is a cross-sectional end view of the handle portion of the fork shown in FIGS. 4A-4C.
Figure 4E:
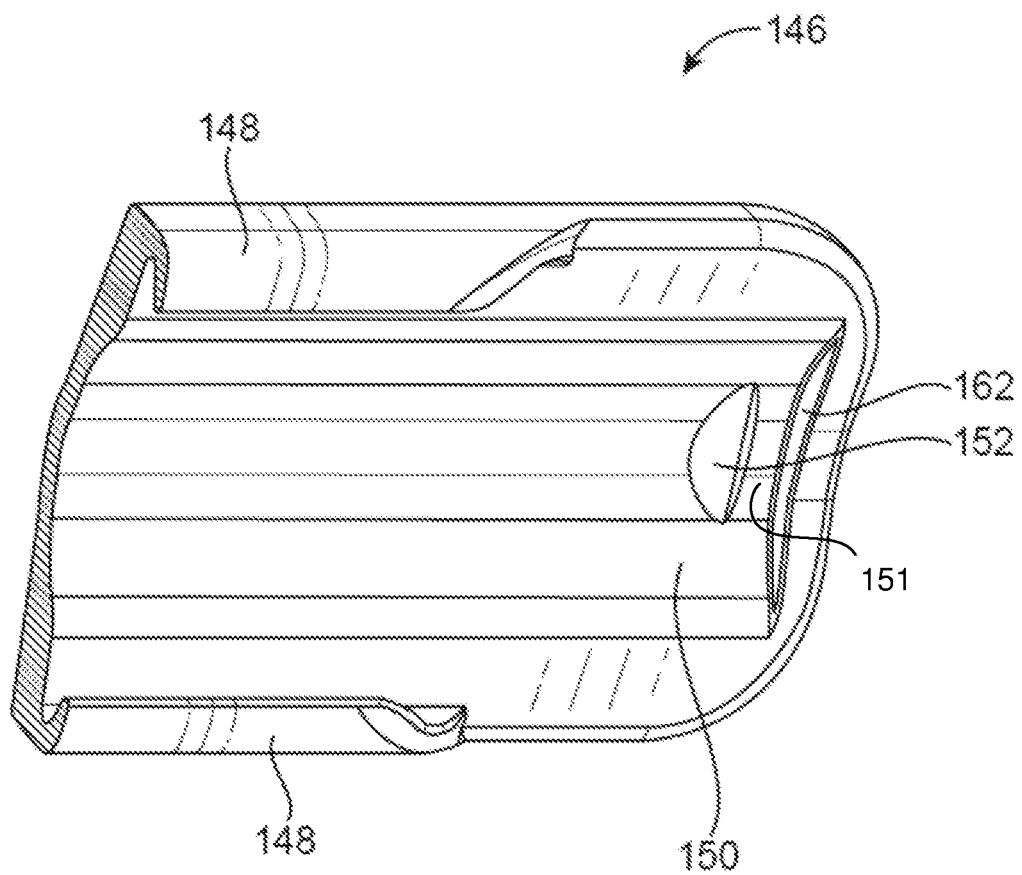
FIG. 4E is a detailed cut-away view of the handle portion of the fork shown in FIGS. 4A-4D.

As shown in FIG. 4D, the handle portion 146 of the fork 140 has a slight upside down V-shape with a ridge 156 in the center when viewed from an end. The center ridge 156 is the highest point of the handle 146 and runs down the center along substantially the entire length of the handle 146. Each side of the handle 146 angles downward from the center line to the edge at an angle of about 75-80 degrees, and preferably about 79 degrees.

Figure 4F:
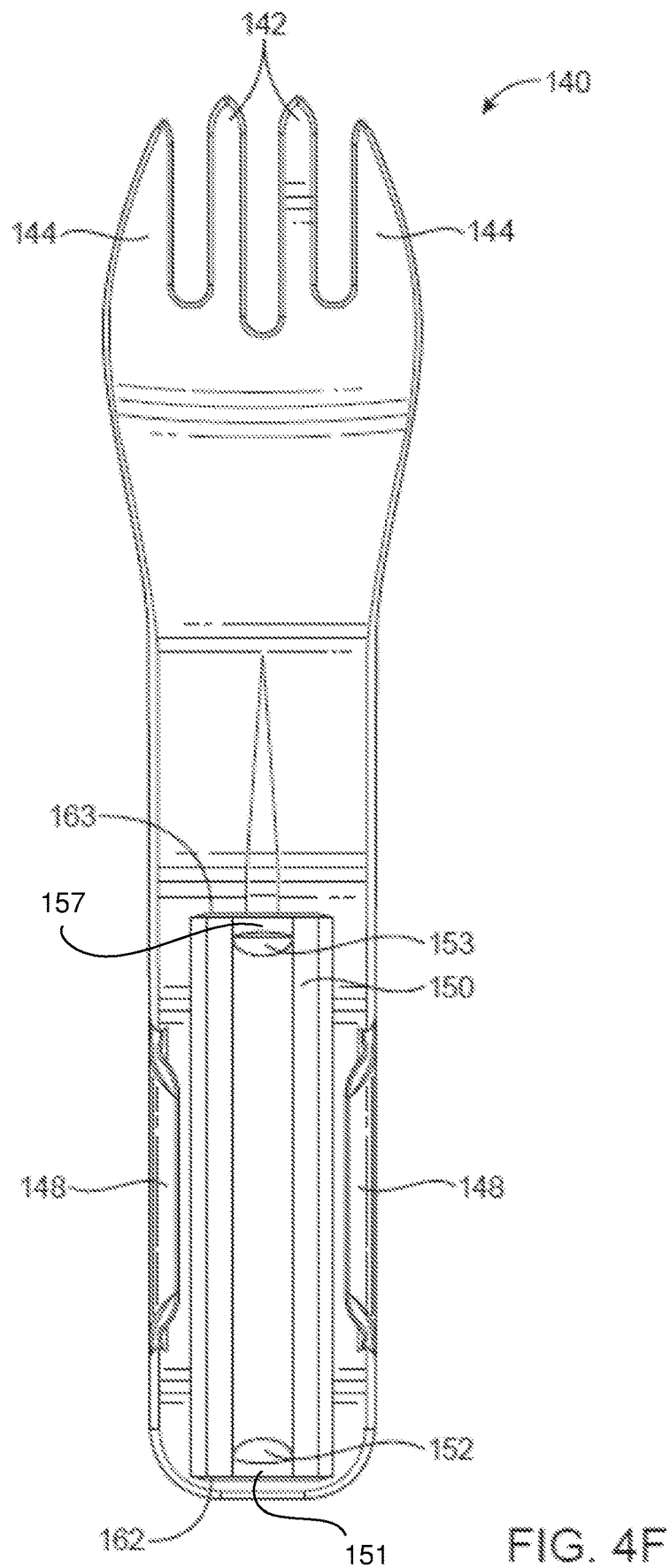
FIG. 4F is a bottom plan view of the fork shown in FIGS. 4A-4E.
Figure 4G:
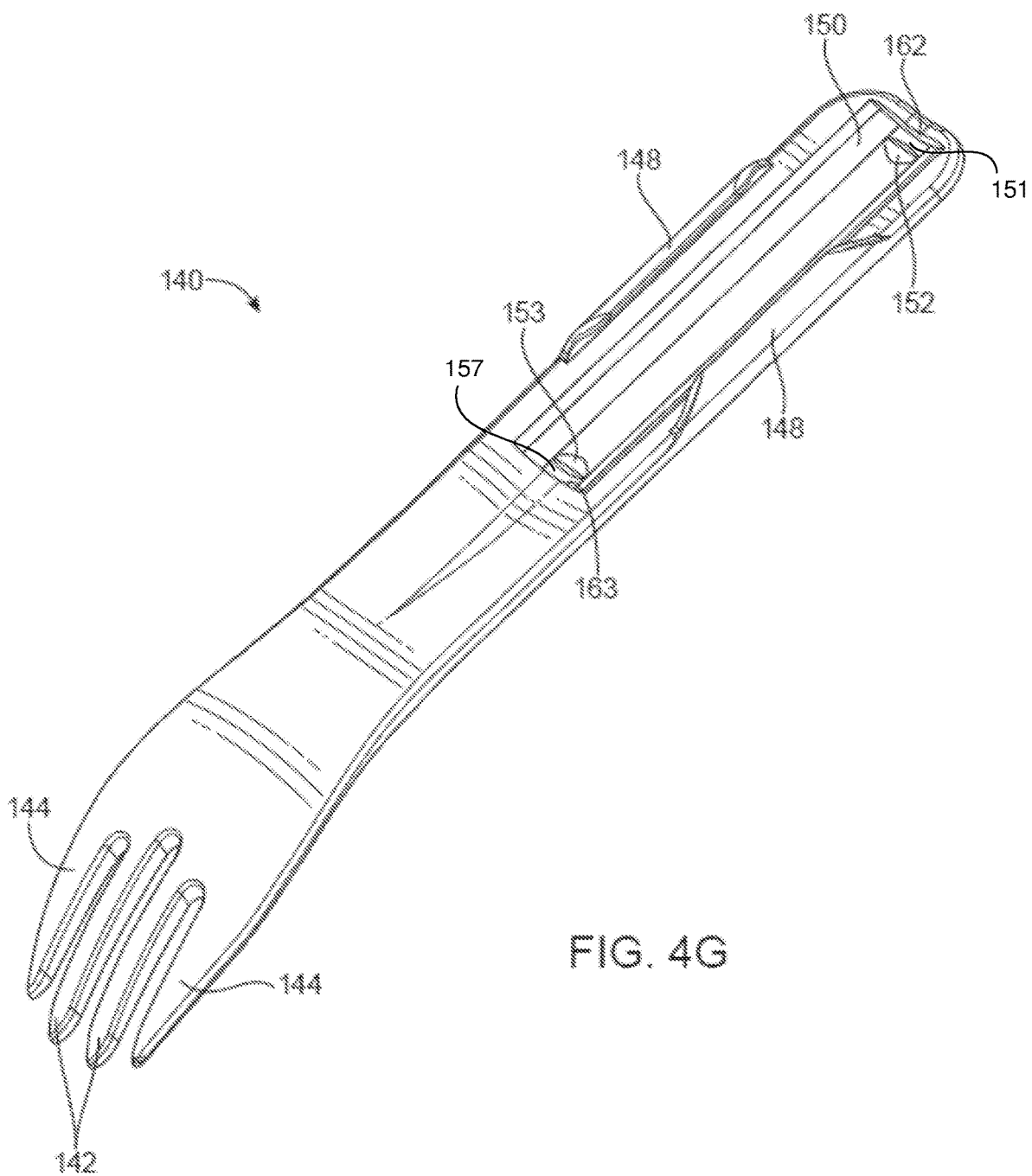
FIG. 4G is a bottom perspective view of the fork shown in FIGS. 4A-4F.
Figure 4H:
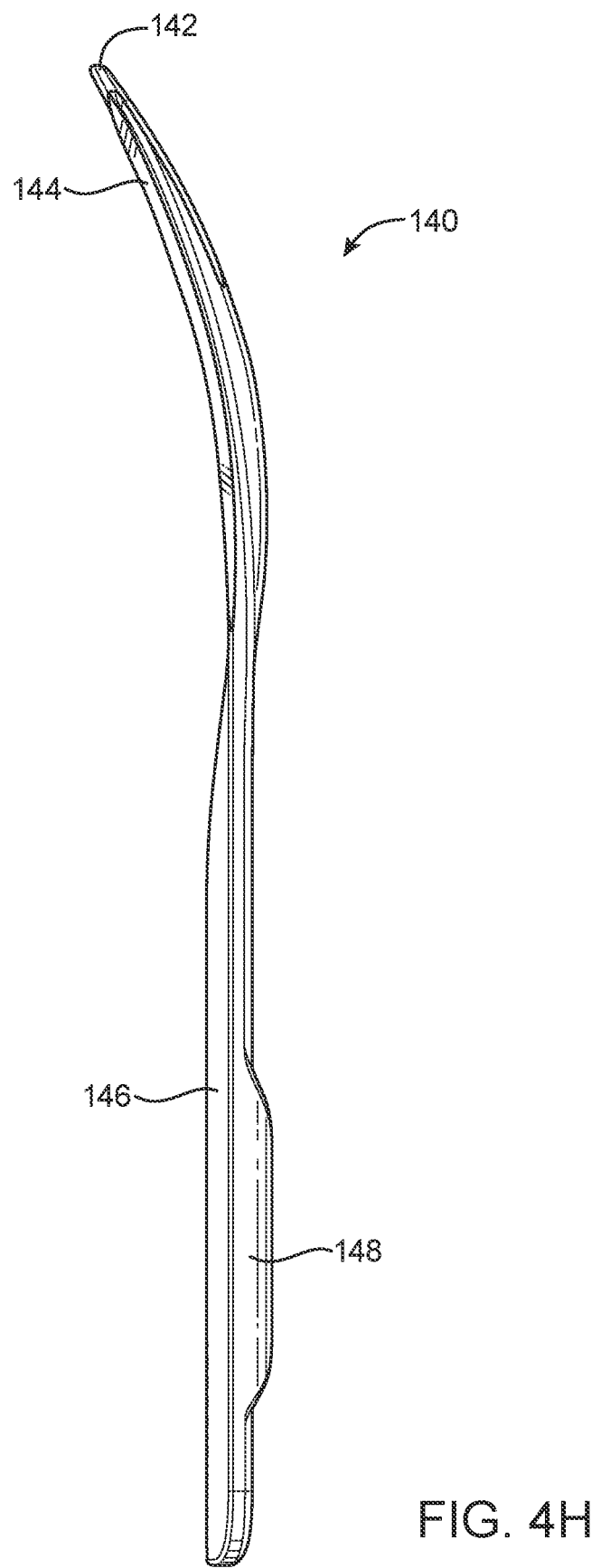
FIG. 4H is a side view of the fork shown in FIGS. 4A-4G.

The bottom of the fork handle 146 also includes a recess 150 that accommodates the contour of the top surface of the handle 114 of the spoon 110 as well as a crescent-shaped raised edge 116 on the proximal end of the spoon 110. As shown in FIGS. 4F and 4G, the recess 150 has two straight end walls 162, 163, each acting as a hard stop when the raised edge 116 of the spoon 110 abuts the end wall.

The recess 150 also includes two detents 152, 153, one near each end of the recess 150. As will be explained in more detail below, the detents 152, 153 serve to snap and lock the spoon handle 114 in place relative to the handle 146 of the fork when the spoon 110 and fork 140 are in the nested position as well as when the spoon 110 and fork 140 are attached end to end to form an elongated eating utensil, as shown in FIGS. 6A-6D.

Figure 5A:
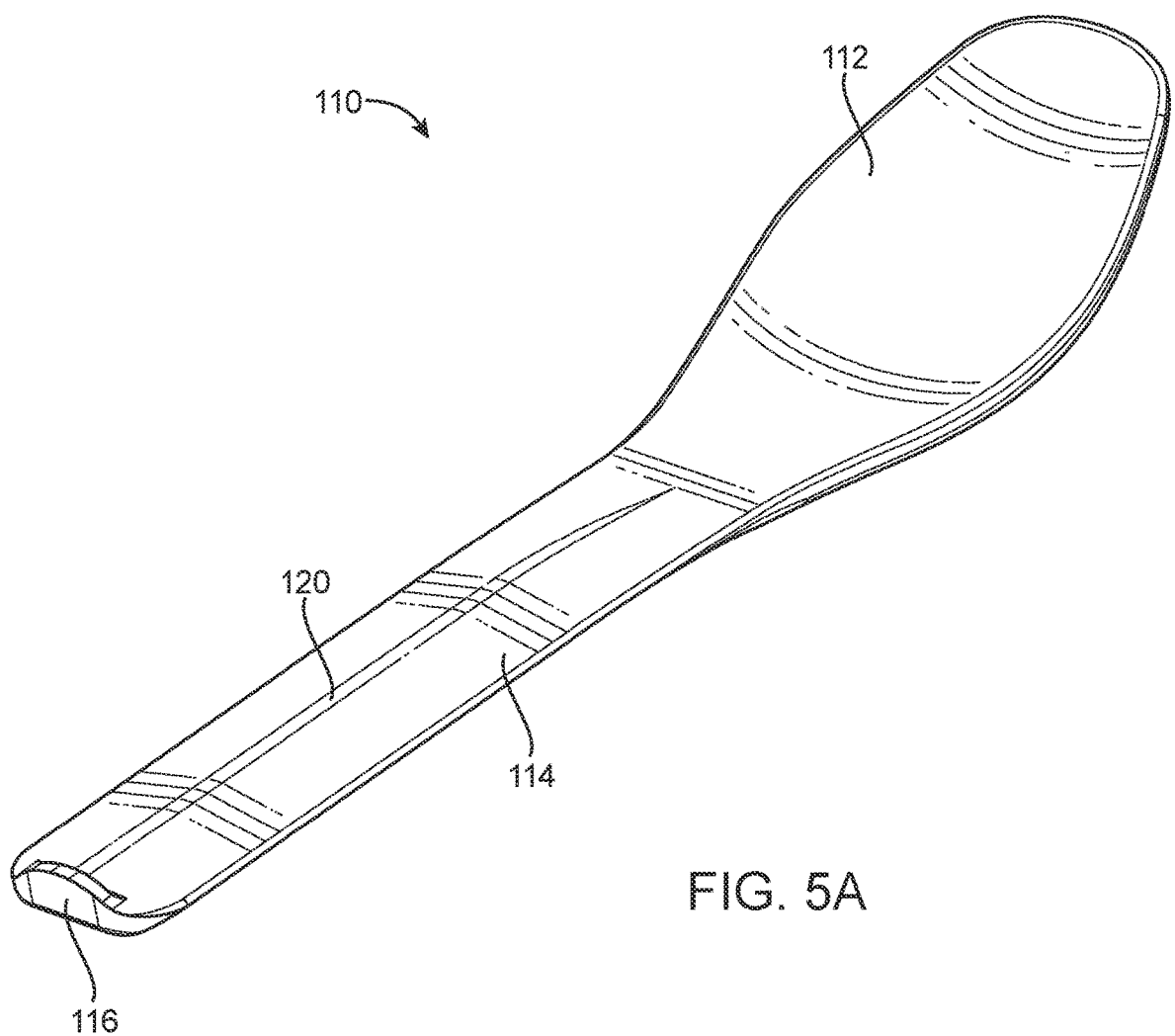
FIG. 5A is a top perspective view of the spoon separated from the fork of the embodiment shown in FIGS. 1-3.

The spoon 110 will be described below with reference to FIGS. 5A-5D. FIG. 5A is a top perspective view of the spoon 110. The spoon 110 includes a head portion or bowl 112 and a handle 114. The proximal end of the spoon handle 114 includes a crescent-shaped raised edge 116. As shown in the side view of FIG. 5D, the raised edge 116 protrudes above the top surface of the spoon handle 114.

The spoon handle 114 and the fork handle 146 are contoured similarly. As shown in FIG. 5A, the spoon handle 114 has a ridge 120 in the center. The center ridge 120 is the highest point of the handle body (excluding the raised edge 116) and runs down the center along substantially the entire length of the handle 114. Each side of the handle 114 angles downward from the center line 118 to the edge at an angle of about 75-80 degrees, and preferably about 79 degrees.

Figure 5B:
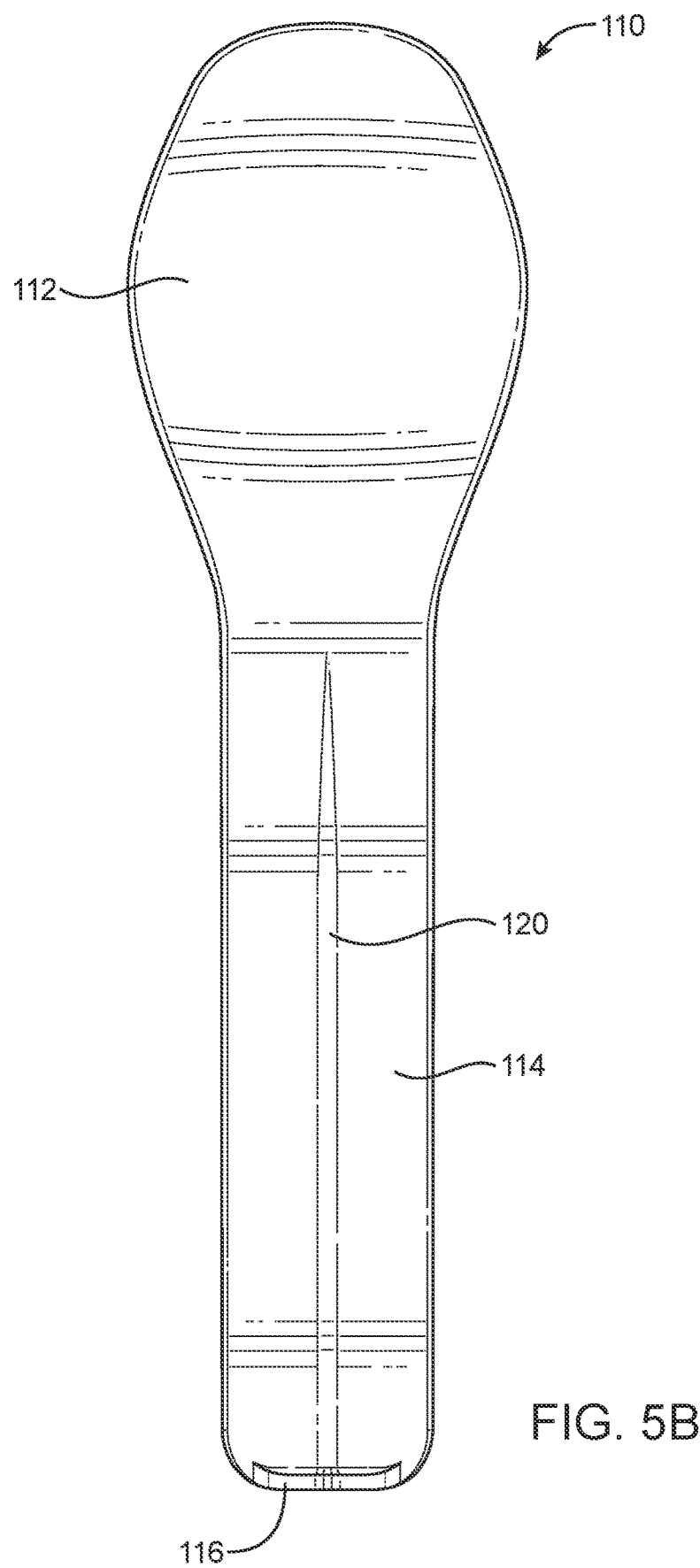
FIG. 5B is a top plan view of the spoon shown in FIG. 5A.

The bowl 112 of the spoon 110 has a substantially flat side edge 118, which allows for "scraping" food from of a container (e.g., a yogurt container) or a bowl. A conventional spoon typically has a rounded edge that is not particularly effective for scraping. As illustrated, the side edge 118 and front edge 118b of the bowl 112 of the spoon 110 is substantially flat, thus providing an effective surface for scraping. In the illustrated embodiment, as shown in FIG. 5B, the bowl 112 has a substantially elongated pentagonal shape with rounded corners.

Figure 5C:
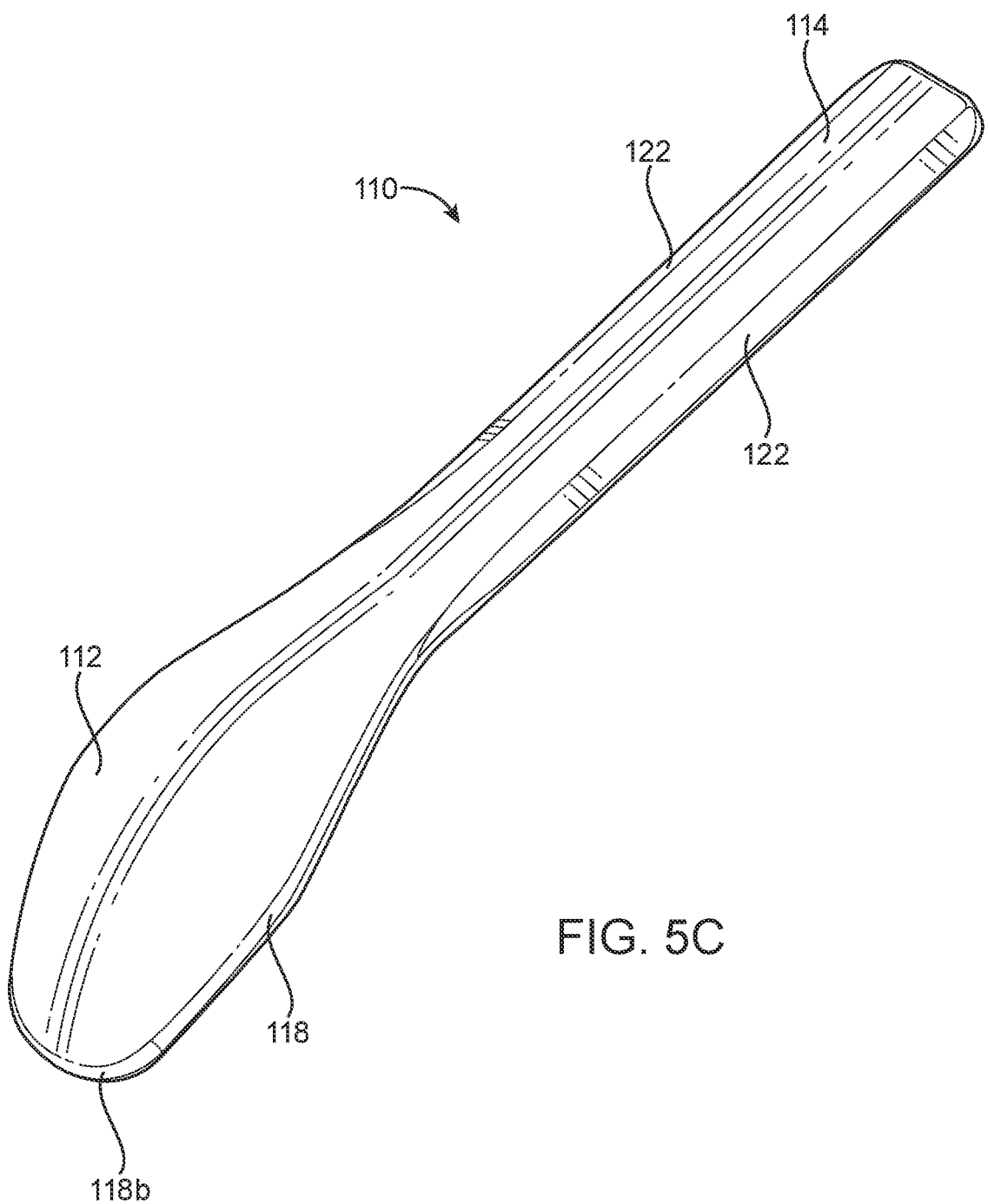
FIG. 5C is a bottom perspective view of the spoon shown in FIGS. 5A and 5B.
Figure 5D:
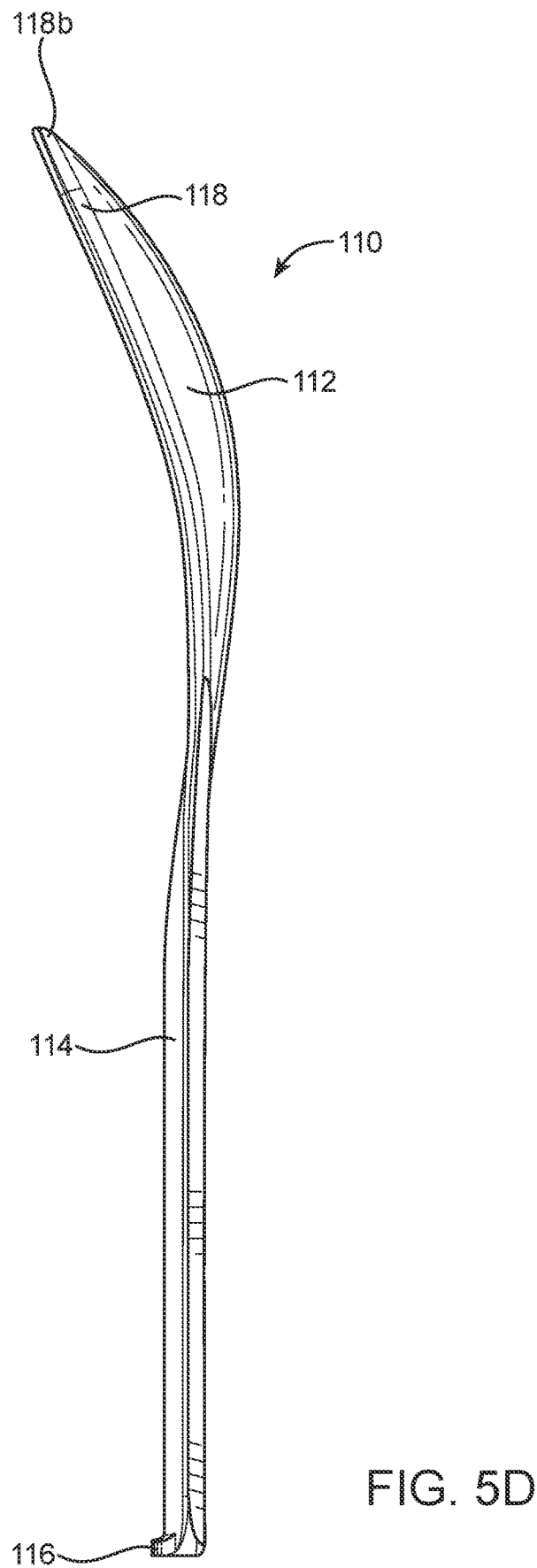
FIG. 5D is a side view of the spoon shown in FIGS. 5A-5C.

Also, as shown in the side view of FIG. 5D, the bowl 112 is angled upward to form a deeper bowl, which can be more efficient when scooping liquids, such as soups. In a particular embodiment, the bowl is angled upward at an angle of about 20-25 degrees, and preferably about 23 degrees. It will be noted that the spoon 110 has a deeper bowl 112 than the corresponding head portion 141 of the fork 140 so that the fork 140 can be nested on top of the spoon 110 in the nested position.

In the illustrated embodiment, the bottom surface of each of the edges 122 of the handle 114 of the spoon 110 is tapered or chamfered so that the edge 122 can be used as a splitter or cutter, similar to the outer tines 144 of the fork 140. In the illustrated embodiment as shown in FIG. 5C, the chamfered edge 122 starts at the proximal end of the spoon 110 and extends along the entire length of the spoon handle 114. In a particular embodiment, the edges 122 are chamfered at an angle of about 65-70 degrees, and preferably about 67 degrees, and each edge 122 has a width of about 0.7 mm at its widest point. The width remains substantially the same along the length of the chamfered edge 122 but tapers to end in a point where the spoon handle 114 meets the head portion or bowl 112, as shown in FIG. 5C. Although the spoon head portion or bowl 112 is described above as being connected to or meeting the spoon handle 114, it will be understood that the spoon is formed as an integral piece in this embodiment. In the illustrated embodiment, both edges 122 are chamfered so that both edges 122 can easily be used to cut or separate food regardless of whether the user is right-handed or left-handed.

The taper of the bottom surface edges 122 of the spoon handle 114 also allows for low profile rails 148 on the fork 140, as the edges 122 of the spoon 140 are configured to slide under and between the rails 148 of the fork 140 to either nest the spoon 110 and fork 140 together or to form a longer combination eating utensil. That is, the bottom edges 122 are chamfered at an angle that corresponds to the angle of the bottom surface of the rails 148 on the fork 140. According to an embodiment, the height of the rails is about 1.5-3 mm and the height of the edges 122 is about 0.5-1.75 mm.

The rails 148 are so low profile that when the spoon 110 and fork 140 are interlocked (whether in the nested position or connected in the elongated combination utensil position), the bottom of the spoon bowl 112 actually extends below the bottom of the rails 148, as shown in the side view of FIGS. 3 and 6D.

The spoon 110 and fork 140 are formed of a plastic material, such as a glass reinforced thermoplastic, that is suitable for food contact. A particularly suitable reinforced thermoplastic for forming the spoon 110 and fork 140 is glass filled nylon. Compared with unreinforced nylon, glass filled nylon has increased structural strength and stiffness.

Nested Position

As shown in FIGS. 1-3, the spoon 110 and fork 140 can be nested together for storage and/or transport. In the nested position, the spoon 110 and fork 140 are interlocked with the spoon head 112 and the fork head 141 oriented the same way. An interlocking mechanism can lock the spoon 110 in place relative to the fork 140, as will be described in more detail below.

As described above, there is a recess 150 in the bottom surface of the fork 140 that is configured to receive the top surface spoon handle 114 and its crescent-shaped raised edge 116. To nest the spoon 110 and fork 140 together, the spoon 110 is first positioned underneath the fork 140 in the same orientation (the spoon 110 and fork 140 are both facing up or both facing down) and both pointed in the same direction (the bowl and tines pointed in the same direction), with the raised edge 116 at the proximal end of the spoon positioned in the recess 150 of the fork 140 laterally between the rails 148 and the detent 153 closer to the distal end of the fork 140. The curvature of the crescent-shaped raised edge 116 corresponds to the curvature of the recess 150 such that the raised edge 116 fits nicely in the recess 150.

The raised edge 116 at proximal end of the spoon 110 is then slid laterally along the recess 150 toward the proximal end of the fork 140 while guiding the outer edges of the spoon handle 114 between the rails 148 until the raised edge 116 abuts the gradually sloped face of the detent 152 closer to the proximal end of the fork 140. A greater force is then applied in the same direction to push the raised edge 116 over the gradually sloped face of the detent 152 and over the top of the detent 152 to engage the groove between the detent 152 and the proximal end wall 162 of the recess 150. As the raised edge 116 is pushed over the gradually sloped face of the detent 152, the handle-ends of the spoon 110 and fork 140 are bent away from each other. This bending allows the crescent of the raised edge 116 to ride up and over the detent 152. The distance between the ends of the rails 148 and the detent 152 effectively creates beams in the spoon and fork ends that are made to bend through the pressing or pulling action. It will be appreciated that the snapping force can be tuned by such things as changing the length of the rails and/or the size of the detent. That is, longer rails results in shorter beams making it more difficult to deflect and snap. Conversely, shorter rails result in longer beams making it easier to deflect and snap.

With the detent 152 snapped in the groove between the detent 152 and the proximal end wall 162 of the recess 150, the spoon 110 and fork 140 are interlocked. The end wall 162 acts as a hard stop and prevents the spoon 110 from moving beyond the locked position and the detent 152 prevents the spoon 110 from moving back in the opposite direction to disengage the fork 140. The rails 148 prevent the fork 140 and spoon 110 from being separated in the z-direction.

It will be noted that the crescent shape of the raised edge 116 provides additional surface area to abut the end wall 162 to prevent the spoon 110 from sliding past the locked position. When the raised edge 116 engages the space between the detent 152 and the end wall 162, the spoon 110 and fork 140 are interlocked in the nested position and fairly significant force is required to disengage the spoon 110 and fork 140 from the nested position because the raised edge 116 must move over the top of the detent 152 without the benefit of a gradually sloped face of the detent 152. It will be understood that greater force is necessary to disengage the spoon from the fork than is required to interlock the utensils in the nested position because the detent 152 is gradually sloped leading to the top of the detent 152 from the center of the distal end of the fork 140 whereas the opposite side of the detent 152 opposite the end wall 162 is more steeply angled, as illustrated. The more gradually sloped face of the detent 152 makes it easier for the raised edge 116 to slide up to the top of the detent 152. According to an embodiment, the slope of the gradually sloped face of the detent is at an angle of about 15 degrees. The gradually sloped face can also be formed as a curved surface of about 4 mm radius.

As shown in FIGS. 4F and 4G, there are two detents 152, 153. Each detent has an angled face on both sides. The sides facing together or inward are more gradually sloped, and the sides facing away from each other are steeply sloped. The inward-facing detent angles are more gradually sloped to permit easier nesting of the fork and spoon (as explained above) or extension to form the elongated combination utensil (as explained in more detail below). The outward-facing detent angles are steeper making it more difficult to "un-snap" or disengage the spoon and fork from each configuration.

To disengage the spoon 110 and fork 140 from the interlocked nested position, the spoon 110 and fork 140 can simply be pulled apart from one another in the lateral direction. A particularly convenient way to disengage the spoon 110 and fork 140 from the interlocked nested position is to start with the nested spoon and fork system 100 upside down. Thus, with the bottom of the spoon 110 facing up, a user can hold the handles with a conventional grip while using a thumb to push the bowl 112 toward the distal end to disengage the spoon 110 and fork 140. With enough force applied, the raised edge 116 of the spoon 110 will move over the nub 152 and the raised edge 116 of the spoon 110 can slide along the recess 150 and the spoon handle 114 can slide between the rails 148 until the raised edge 116 is once again between the rails 148 and the nub 152 closer to the distal portion of the fork 140. When the raised edge 116 has moved past the rails 148, the spoon 110 can be disengaged from the fork 140 and separated.

The rails 148 are centered laterally between the detents 152, 153, as shown in FIGS. 4F and 4G. In the illustrated embodiment, the rails 148 are approximately half the length of the recess 150. The length as well as the position of the rails 148 along the handle 146 are important for a properly functioning interlocking mechanism. It will be appreciated that the rails 148 need to have a certain length in order to adequately secure the handles 114, 146 together when the spoon and fork are interlocked. The centering of the rails 148 laterally with respect to the length of the recess 150 and the positioning of the detents 152, 153 is important to allow for the raised edge 116 of the spoon handle 114 to engage the recess 150 at one end of the recess and also for the raised edge 116 to engage the detent on the other end of the recess 150 to snap the spoon and fork in the interlocked position (whether nested or connected end to end to form a combination utensil).

Elongated Combination Utensil

As mentioned above, the spoon 110 and fork 140 can be connected end to end to form an elongated combination utensil having a fork 140 on one end and a spoon 110 on the other end, with an elongated handle in between. Such an elongated utensil can be useful in certain situations, such as stirring food in a pot or eating out of deep containers or bagged foods.

The elongated combination utensil will be described with reference to FIGS. 6A-6D, which represent various views of the spoon 110 and fork 140 connected end to end to form the elongated combination utensil. The interlocking mechanism for forming the elongated combination utensil is the same as that for the nested position except that it operates in the opposite direction, as explained in more detail below.

To assemble the combination utensil, the fork 140 and spoon 110 are positioned facing opposite directions (with the spoon 110 on one end and the fork 140 on the other end) but with the same orientation (both facing up or both facing down). The raised edge 116 of the spoon 110 is then positioned in the recess 150 between the rails 148 and the detent 152 closer to the proximal end of the fork 140. The spoon 110 is then slid toward the distal end of the fork 140, with the crescent-shaped raised edge 116 sliding along the correspondingly shaped recess 150 and the outer edges of the spoon handle 114 between the rails 148. Once the raised edge 116 abuts the gradually sloped face of the detent 153 closer to the distal end of the fork 140, additional force is necessary to push the raised edge 116 up along the angled portion of the detent 153 and over the top of the detent 153 until the raised edge 116 engages the groove between the detent 153 and the distal end wall 163 of the recess 150. With the raised edge 116 engaged in the groove between the detent 153 and the end wall 163, the spoon 110 and fork 140 are interlocked in the elongated combination utensil position.

It will be understood that the end wall 163 acts as a hard stop, preventing the spoon 110 from being slid further. The end wall 163 prevents the spoon 110 from moving beyond the locked position and the detent 153 prevents the spoon 110 from moving back in the opposite direction to disengage the fork 140. The rails 148 not only prevent the fork 140 and spoon 110 from being separated in the z-direction, but also prevent the fork and spoon from being separated by bending (both side-to-side and top-to-bottom bending) as well by torsion or twisting forces.

When the raised edge 116 engages the groove between the detent 153 and the distal end wall 163 of the recess 150, the spoon 110 and fork 140 are interlocked in the combination utensil position and fairly significant force is required to disengage the spoon 110 and fork 140 from this position. To disengage the spoon 110 and fork 140, with the spoon 110 and fork 140 are simply pulled apart in the lateral direction. With enough force applied, the gradually sloped face of the detent 153 exerts a normal force on the ends of the handles 114, 146, thereby bending them and allowing the raised edge 116 of the spoon 110 to move over the top of the detent 153. The spoon 110 can then slide along the recess 150 between the rails 148 until the raised edge 116 is once again positioned laterally between the rails 148 and the detent 152 closer to the proximal portion of the fork 140. When the raised edge 116 has moved laterally past the rails 148, the spoon 110 can be disengaged from the fork 140 and separated. It will be understood that greater force is necessary to disengage the spoon from the fork than is required to interlock the utensils because the detent 153 is more gradually sloped leading to the top of the detent 153 from the center of the proximal end of the fork 140 whereas the opposite face of the detent 153 opposite the end wall 163 is more steeply sloped. According to an embodiment, the gradually sloped face of the detent is at an angle of about 15 degrees.

Figure 6A:
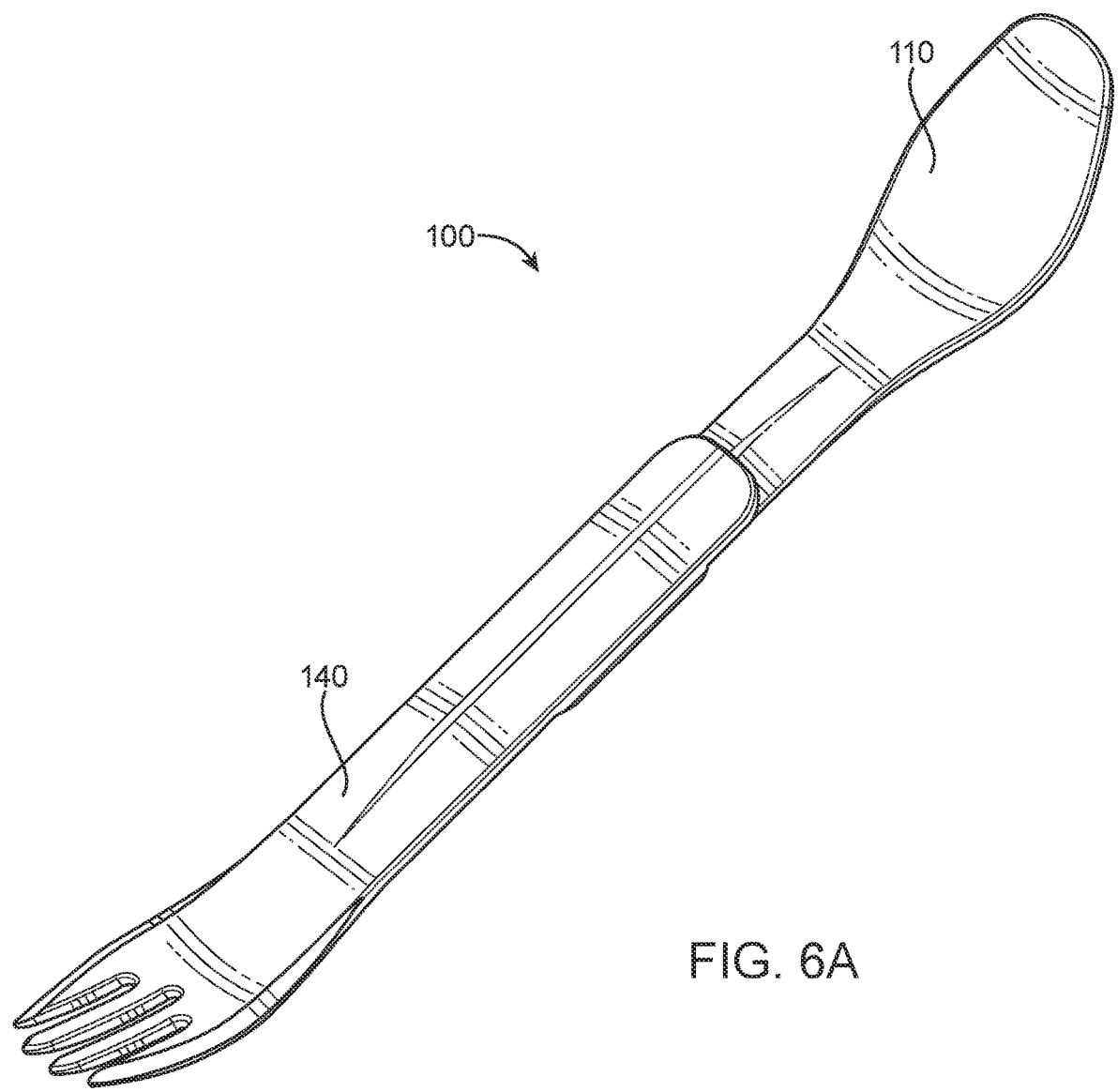
FIG. 6A is a perspective view of the combination spoon and fork system in the elongated combination utensil position in accordance with an embodiment.
Figure 6B:
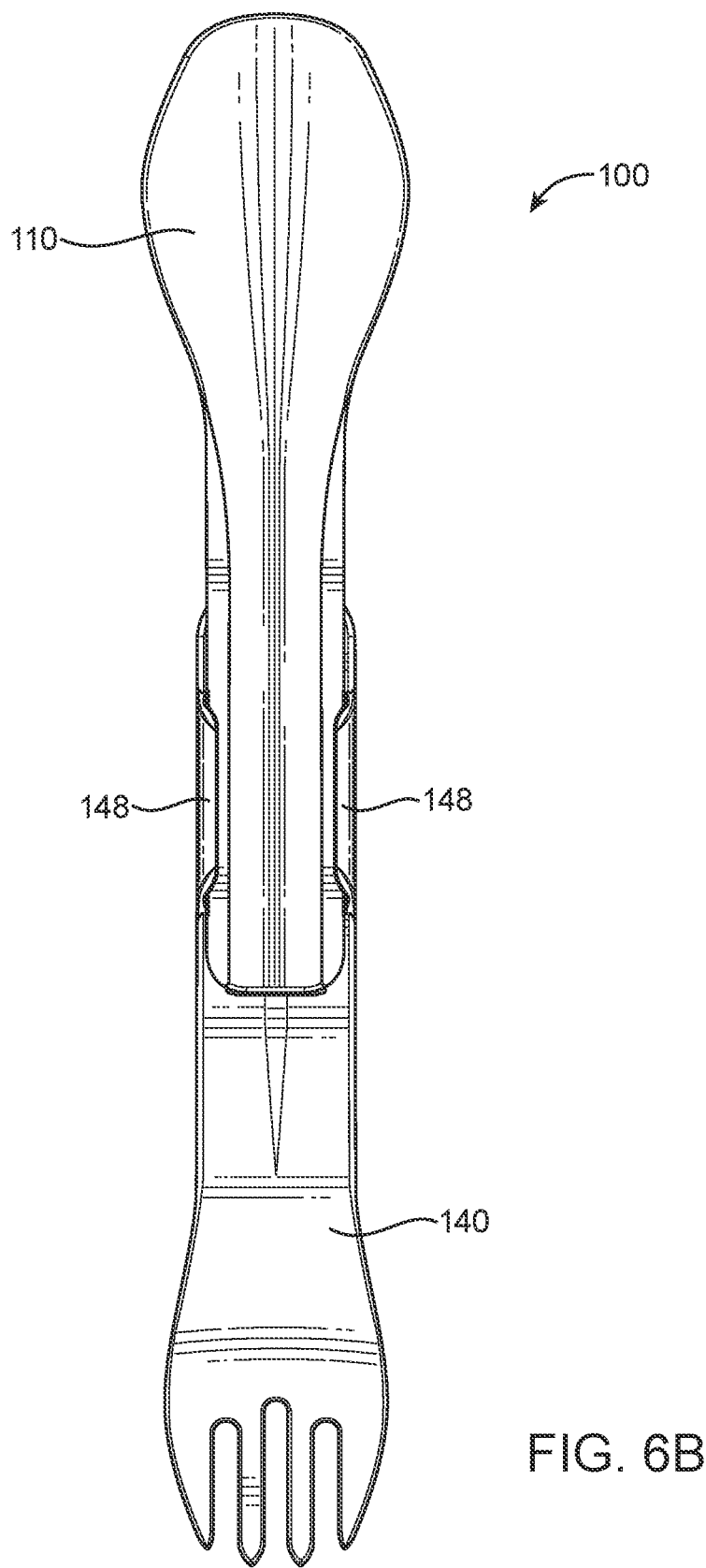
FIG. 6B is a bottom plan view of the embodiment shown in FIG. 6A.
Figure 6C:
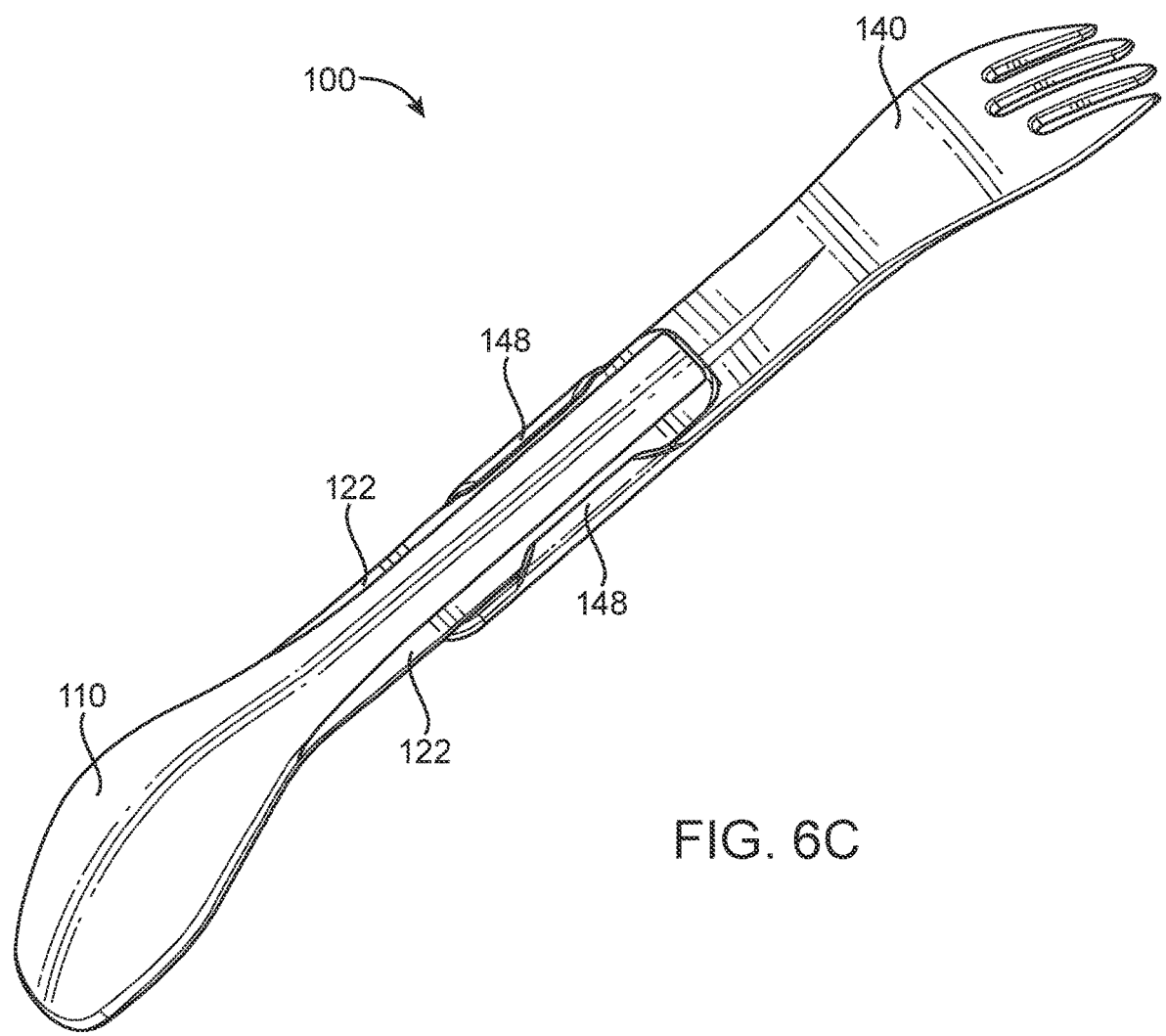
FIG. 6C is a bottom perspective view of the embodiment shown in FIGS. 6A and 6B.
Figure 6D:
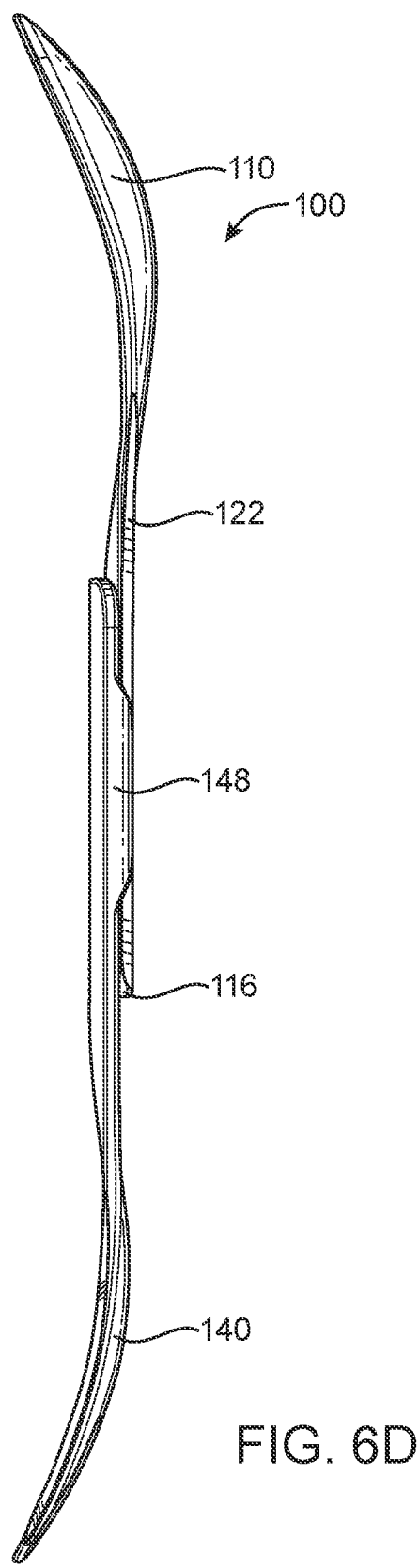
FIG. 6D is a side view of the embodiment shown in FIGS. 6A-6C.

As noted above, the spoon 110 and fork 140 are oriented in the same direction (with both heads 141, 112 facing up or both facing down) when connected end to end such that the combination spoon and fork system 100 has a substantially wide U-shaped configuration, as shown in FIG. 6D. It will be appreciated that the U-shaped configuration is comfortable for a user to hold and manipulate. With the spoon head 112 and the fork head 141 oriented the same way, the fork head 141 does not get in the way of the user's hand when the combination utensil is being used as a spoon and when the combination utensil is being used as a fork, the spoon head 112 does not get in the way of the user's hand.

Integral Combination Utensil

Figure 7A:
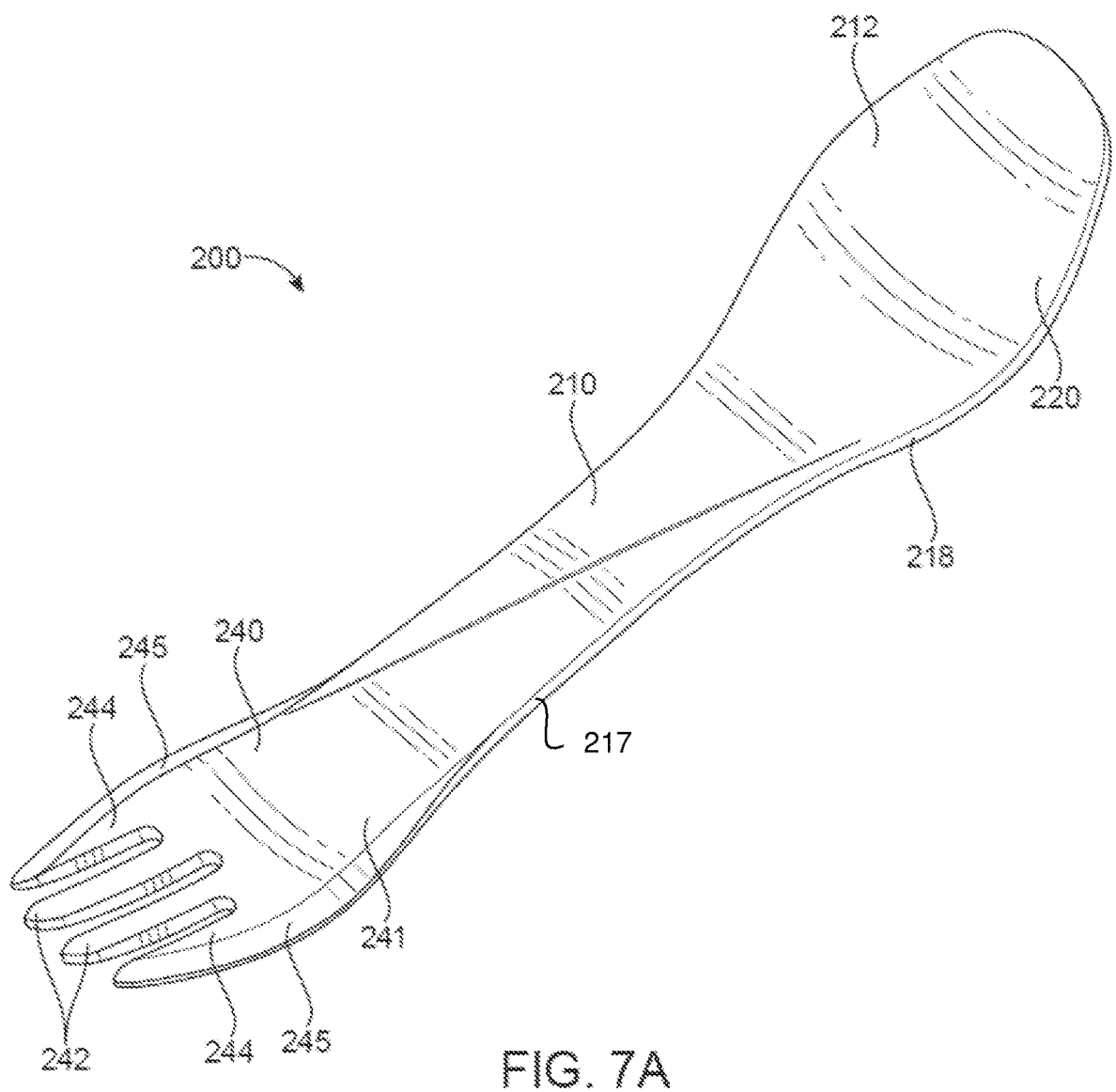
FIG. 7A is a top perspective view of an integral combination utensil in accordance with an embodiment.
Figure 7B:
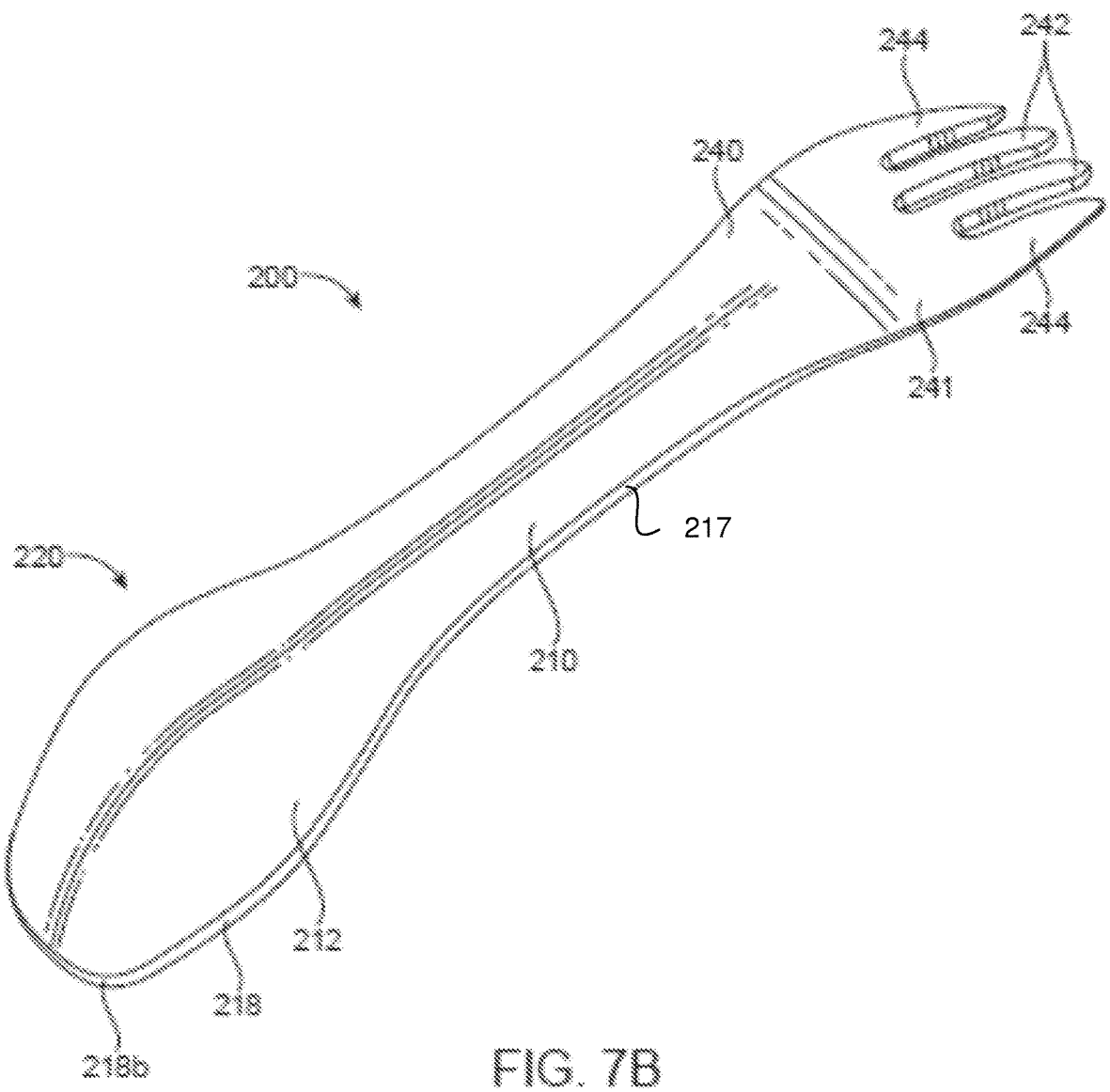
FIG. 7B is a bottom perspective view of the integral combination utensil shown in FIG. 7A.
Figure 7C:
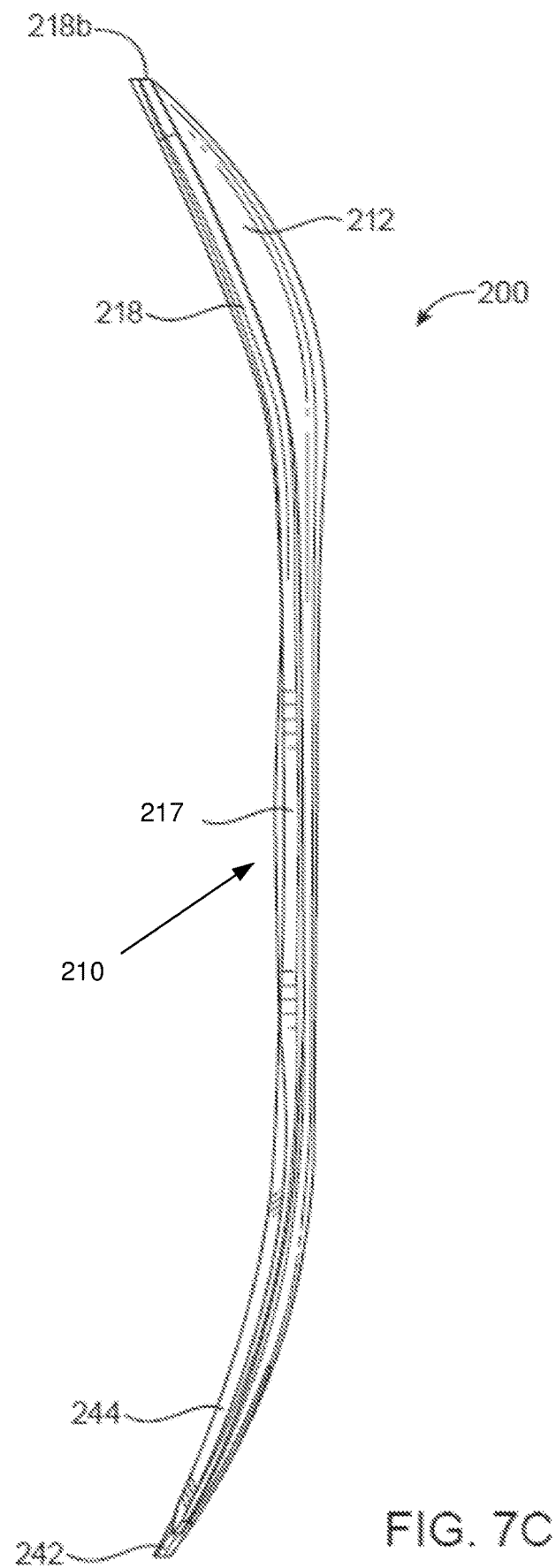
FIG. 7C is a side view of the integral combination utensil shown in FIGS. 7A and 7B.

According to another embodiment, an integral combination fork and spoon utensil 200 is shown in FIGS. 7A-7C. This embodiment is related to concurrently filed U.S. Design Application No. 29/484,553, which is incorporated herein by reference. This embodiment is similar to the elongated combination utensil shown in FIGS. 6A-6D except that this embodiment is formed as a single integral unit. The handle 210 is positioned laterally between a spoon 220 on one end and a fork 240 on the other end.

The fork 240 has a head portion 241, which includes the tines, that is connected to handle 210. In the illustrated embodiment, the fork 240 has two substantially straight center tines 242. The two outer tines 244 each have a substantially straight inner edge and a curved outer edge 245. The curvature of the outer edges 245 can also be used for scraping food from a container, as the curved edges 245 follow the curvature of a curved container, such as a bowl, better than the straight tines of many conventional forks. In the illustrated embodiment, the fork 240 has four tines 242, 244. It will be understood that, in other embodiments, the fork can have more or fewer tines. Each tine 242, 244 has a pointed tip, which aids in spearing or piercing pieces of food so that the food can be picked up by the fork 240.

In addition to being curved, the outer edges 245 of the two outer tines 244 are also tapered or chamfered such that the fork 240 can be used to cut through or separate foods that do not require a knife. As illustrated in FIG. 7A, the top surface of each of the outer edges 245 is tapered or chamfered. As illustrated in FIG. 7A, the top surface of each of the curved outer edges 245 is tapered or chamfered. As illustrated, each chamfered edge 245 has one end at the pointed tip of the outer tine 244 and extends along the outer curved edge of the outer tine 244 to the position where the fork head 241 meets the handle 210. As shown in FIG. 7A, the chamfered edge 245 spans the entire width of the outer tine 244 at the pointed tip. As the chamfered edge 245 extends down along the curved outer edge of the outer tine 244, the width of the chamfered edge 145 remains substantially the same until it begins to taper toward the end of the fork head 241. In the illustrated embodiment, the chamfered edge 245 tapers and ends in a point where the fork head 241 meets the handle 210. In a particular embodiment, the outer edges 245 are chamfered at an angle of about 20-25 degrees, and preferably about 23 degrees, and the chamfered edge has a width of about 1 mm. In the illustrated embodiment, the outer edges 245 of both outer tines 244 are chamfered so that both outer edges 245 can easily be used to cut or separate food regardless of whether the user is right-handed or left-handed. In the illustrated embodiment, the center tines 242 are longer than and extend further distally than the outer tines 244, thereby forming a curve at the distal end of the fork 240 when viewed from the top.

The spoon 220 has a head portion or bowl 212 on its distal end. The bowl 212 of the spoon 220 has a substantially flat side edge 218 and end edge 218b, which allows for "scraping" food from of a container (e.g., a yogurt container) or a bowl. As shown in the side view of FIG. 7C, the bowl 212 is angled upward to form a deeper bowl, which can be more efficient when scooping liquids, such as soups. In a particular embodiment, the bowl 212 is angled upward at an angle of about 20-25 degrees, and preferably about 23 degrees. In the illustrated embodiment, the bowl 212 has a substantially elongated pentagonal shape with rounded corners.

It will be noted that the integral combination fork and spoon utensil 200 can be formed with a handle of any desired length. That is, the handle can be a standard length, or if desired, the handle can be shorter or elongated. In a particular embodiment, the handle has a length of about 165 mm. Similar to the elongated combination utensil described above, the integral combination utensil also has a substantially wide U-shaped configuration with the spoon 210 and fork 240 are oriented in the same direction (with both heads 241, 212 facing up or both facing down) when connected end to end such that the integral combination spoon and fork system 200 has a substantially wide U-shaped configuration, as shown in FIG. 7C. As noted above, the substantially U-shaped configuration is comfortable for a user to hold and manipulate. With the spoon head 212 and the fork head 241 oriented the same way, the fork head 241 does not get in the way of the user's hand when the integral combination utensil is being used as a spoon. When the integral combination utensil is being used as a fork, the spoon head 212 does not get in the way of the user's hand.

Although only a few embodiments of the invention have been described in detail, it should be appreciated that the invention may be implemented in many other forms without departing from the spirit or scope of the invention. In view of all of the foregoing, it should be apparent that the present embodiments are illustrative and not restrictive and the invention is not limited to the details given herein, but may be modified within the scope and equivalents of the appended claims.

What is claimed is:

1. An eating utensil comprising:
   a fork head including a plurality of tines and a concave fork bowl portion, the plurality of tines including first and second outer tines and two inner tines positioned laterally between the first and second outer tines;
   the first outer tine having (i) a first proximal base, (ii) a first curved outer tine edge that is part of a corresponding first outer edge of the fork head, and (iii) a first chamfered surface extending laterally inward from the first outer tine edge of the first outer tine;

the second outer tine having (iv) a second proximal base, (v) a second curved outer tine edge that is part of a corresponding second outer edge of the fork head, and (vi) a second chamfered surface extending laterally inward from the second outer tine edge of the second outer tine;

a handle integrally formed with the fork head at a first end of the handle, wherein a front surface of the eating utensil includes a concave surface of the concave fork bowl portion, and a front surface of the handle; and wherein the first and second chamfered surfaces are each on the front surface of the eating utensil, and wherein the first chamfered surface extends along the first outer edge of the fork head proximally towards the handle beyond the first proximal base such that the first curved outer tine edge acts as a first splitting feature, and the second chamfered surface extends along the second outer edge of the fork head proximally towards the handle beyond the second proximal base such that the second curved outer tine edge acts as a second splitting feature.

2. The eating utensil as recited in claim 1, wherein the eating utensil is formed of a glass reinforced thermoplastic material.

3. The eating utensil as recited in claim 1 wherein the eating utensil is formed from a glass filled nylon.

4. The eating utensil as recited in claim 1, wherein each chamfered surface extends along the corresponding outer edge of the fork head from a tip of the corresponding outer tine to the handle and tapers to a point where the handle meets the fork head, whereby the chamfered surfaces extend proximally beyond a laterally widest portion of the fork head.

5. The eating utensil as recited in claim 1, wherein the first curved outer tine edge that acts as the first splitting feature has a smooth surface.

6. The eating utensil as recited in claim 5, wherein the second curved outer tine edge that acts as the second splitting feature has a smooth surface.

7. The eating utensil as recited in claim 1, wherein each chamfered surface extends to a corresponding point where the handle portion meets the fork head portion.

8. The eating utensil as recited in claim 1, wherein the first and second outer tines have a substantially similar size.

9. The eating utensil as recited in claim 1 wherein when the eating utensil is viewed from a side with the concave fork bowl portion facing up and a visible side edge of the handle extending horizontally, a visible one of the outer edges of the fork head does not dip below the visible side edge of the handle.

10. The eating utensil as recited in claim 1, wherein the handle has side edges that connect the front surface of the handle to a back surface of the handle and the side edges of the handle are substantially parallel over a majority of a length of the handle.

11. The eating utensil as recited in claim 1 wherein each of the outer tines has an inner surface that is substantially longitudinally in-line with the handle and root gaps between adjacent tines are fully rounded.

12. An eating utensil, comprising:
a fork head including a plurality of tines and a concave fork bowl portion, the plurality of tines including first and second outer tines and two inner tines positioned laterally between the first and second outer tines, the first outer tine further including a first outer tine edge that is part of a corresponding smooth first curved outer edge of the fork head and the second outer tine further including a second outer tine edge that is part of a corresponding second curved outer edge of the fork head;

a handle integrally formed with the fork head at a first end of the handle, wherein a front surface of the eating utensil includes a concave surface of the concave fork bowl portion, and a front surface of the handle; and a chamfered surface on a front surface of the fork head that extends laterally inward from the smooth first curved outer edge of the fork head such that at least portions of the smooth first curved outer edge of the fork head acts as a splitting feature.

13. The eating utensil as recited in claim 12, wherein the chamfered surface extends along the first outer edge of the fork head from a tip of the first outer tine proximally beyond a proximal base of the first outer tine.

14. The eating utensil as recited in claim 13, wherein the chamfered surface extends proximally beyond a laterally widest portion of the fork head.

15. The eating utensil as recited in claim 12, wherein the eating utensil is formed of a glass reinforced thermoplastic material.

16. The eating utensil as recited in claim 12 wherein the eating utensil is formed from a glass filled nylon.

17. The eating utensil as recited in claim 12, wherein the chamfered surface extends proximally to a point where the handle portion meets the fork head portion.

18. The eating utensil as recited in claim 12, wherein:
each of the tines has a proximal base end and a distal tip;
the base ends of outer tines are substantially the same width and are wider than the base ends of inner tines.

19. The eating utensil as recited in claim 12, wherein the handle has side edges that connect the front surface of the handle to a back surface of the handle and the side edges of the handle are substantially parallel over a majority of a length of the handle.

20. The eating utensil as recited in claim 12 wherein when the eating utensil is viewed from a side with the concave fork bowl portion facing up and a visible side edge of the handle extending horizontally, a visible one of the outer edges of the fork head does not dip below the visible side edge of the handle.

21. An eating utensil comprising:
a fork head including a plurality of tines and a concave fork bowl portion, the plurality of tines including first and second outer tines and two inner tines positioned laterally between the first and second outer tines;

the first outer tine having (i) a first proximal base, (ii) a first curved outer tine edge that is part of a corresponding first outer edge of the fork head, and (iii) a first chamfered surface extending laterally inward from the first outer tine edge of the first outer tine;

the second outer tine having (iv) a second proximal base, (v) a second curved outer tine edge that is part of a corresponding second outer edge of the fork head, and (vi) a second chamfered surface extending laterally inward from the second outer tine edge of the second outer tine, and wherein the second outer tine is substantially the same size as the first outer tine;

a handle integrally formed with the fork head at a first end of the handle, the handle having side edges that connect a front surface of the handle to a back surface of the handle, wherein a front surface of the eating utensil includes a concave surface of the concave fork bowl portion, and the front surface of the handle; and wherein the first and second chamfered surfaces are each on the front surface of the eating utensil;

wherein the first chamfered surface extends along the first outer edge of the fork head from a tip of the first outer tine proximally towards the handle beyond the first proximal base such that the first curved outer tine edge acts as a first splitting feature that extends proximally beyond a laterally widest portion of the fork head, the first curved outer tine edge being smooth;

wherein the second chamfered surface extends along the second outer edge of the fork head from the tip of the first outer tine proximally towards the handle beyond the second proximal base such that the second curved outer tine edge acts as a second splitting feature that extends proximally beyond the laterally widest portion of the fork head; and wherein when the eating utensil is viewed from a side with the concave fork bowl portion facing up and a visible one of the side edges of the handle extending horizontally, the outer edges of the fork head do not dip below the visible side edge of the handle.

22. The eating utensil as recited in claim 21 wherein the eating utensil is formed from a glass filled nylon.

23. An eating utensil, comprising:
a fork head including a plurality of tines, wherein the fork head includes a concave fork bowl portion and the plurality of tines includes a first outer tine having (i) a proximal base, (ii) a curved first outer tine edge that is part of a first outer edge of the fork head, and (iii) a chamfered surface extending laterally inward from the first outer tine edge of the first outer tine;

a handle integrally formed with the fork head at a first end of the handle, wherein a front surface of the eating utensil includes a concave surface of the concave fork bowl portion, and a front surface of the handle; and wherein the chamfered surface is on the front surface of the eating utensil and extends along the first outer edge of the fork head proximally towards the handle beyond the proximal base such that the curved first outer tine edge acts as a splitting feature.

24. The eating utensil as recited in claim 23 further comprising a spoon head having a concave spoon bowl portion, wherein the spoon head is integrally formed with the handle at a second end of the handle.

25. The eating utensil as recited in claim 24 wherein the front surface of the eating utensil further includes a concave surface of the concave spoon bowl portion.

26. The eating utensil as recited in claim 23 wherein the plurality of tines include a second outer tine, the second outer tine having (iv) a proximal base, (v) a curved second outer tine edge that is part of a second outer edge of the fork head and (vi) a second chamfered surface extending laterally inward from the second outer tine edge of the second outer tine, wherein the second chamfered surface is on the front surface of the eating utensil and extends along the second outer edge of the fork head proximally towards the handle beyond the proximal base such that the curved second outer tine edge acts as a splitting feature.

27. The eating utensil as recited in claim 23, wherein the chamfered surface extends along the first outer edge of the fork head from a tip of the first outer tine to the handle and tapers to a point where the handle meets the fork head, whereby the chamfered surface extends proximally beyond a widest portion of the fork head.

28. The eating utensil as recited in claim 23, wherein the eating utensil is formed of a glass reinforced thermoplastic material.

29. An eating utensil, comprising:
a fork head including a plurality of tines, wherein the fork head includes a concave fork bowl portion and the plurality of tines includes a first outer tine having (i) a proximal base (ii) a curved first outer tine edge that is part of a first outer edge of the fork head, and (iii) a tapered surface on a front surface of the eating utensil, the tapered surface extending laterally inward from the first outer tine edge of the first outer tine;

a handle integrally formed with the fork head at a first end of the handle, wherein the front surface of the eating utensil includes a concave surface of the concave fork bowl portion, and a front surface of the handle; and wherein the tapered surface extends along the first outer edge of the fork head proximally towards the handle beyond the proximal base such that the curved first outer tine edge acts as a splitting feature.

30. The eating utensil as recited in claim 29, wherein the eating utensil is formed of a glass reinforced thermoplastic material.

31. The eating utensil as recited in claim 29 further comprising a spoon head having a concave spoon bowl portion, wherein the spoon head is integrally formed with the handle at a second end of the handle.

32. The eating utensil as recited in claim 31 wherein the front surface of the eating utensil further includes a concave surface of the concave spoon bowl portion.

33. The eating utensil as recited in claim 29 wherein the plurality of tines include a second outer tine, the second outer tine having (iv) a curved second outer tine edge that is part of a second outer edge of the fork head and (v) a second tapered surface extending laterally inward from the second outer tine edge of the second outer tine, wherein the second tapered surface is on the front surface of the eating utensil and extends along the second outer edge of the fork head proximally towards the handle beyond a proximal base of the second outer tine to help define a second curved splitting feature.

34. The eating utensil as recited in claim 29, wherein the tapered surface extends along the first outer edge of the fork head from a tip of the first outer tine to the handle and tapers to a point where the handle meets the fork head, whereby the tapered surface extends proximally beyond a widest portion of the fork head.

35. An eating utensil comprising:
a fork head including a plurality of tines and a concave fork bowl portion, the plurality of tines including first and second outer tines and two inner tines positioned laterally between the first and second outer tines;

the first outer tine having (i) a first proximal base, (ii) a first curved outer tine edge that is part of a corresponding first outer edge of the fork head, and (iii) a first tapered surface extending laterally inward from the first outer tine edge of the first outer tine, wherein a maximum width of the first tapered surface is less than a maximum width of the first outer tine;

the second outer tine having (iv) a second proximal base, (v) a second curved outer tine edge that is part of a corresponding second outer edge of the fork head, and (vi) a second tapered surface extending laterally inward from the second outer tine edge of the second outer tine, wherein a maximum width of the second tapered surface is less than a maximum width of the second outer tine;

a handle integrally formed with the fork head at a first end of the handle, wherein a front surface of the eating utensil includes a concave surface of the concave fork bowl portion, and a front surface of the handle; and wherein the first and second tapered surfaces are each on the front surface of the eating utensil, and wherein the first tapered surface extends along the first outer edge of the fork head proximally towards the handle beyond the first proximal base such that the first curved outer tine edge acts as a first splitting feature, and the second tapered surface extends along the second outer edge of the fork head proximally towards the handle beyond the second proximal base such that the second curved outer tine edge acts as a second splitting feature.

36. The eating utensil as recited in claim 35, wherein the eating utensil is formed of a glass reinforced thermoplastic material.

37. The eating utensil as recited in claim 35, wherein each chamfered surface extends along the corresponding outer edge of the fork head from a tip of the corresponding outer tine to the handle and tapers to a point where the handle meets the fork head, whereby the chamfered surfaces extend proximally beyond a laterally widest portion of the fork head.

38. The eating utensil as recited in claim 35, wherein the first curved outer tine edge that acts as the first splitting feature has a smooth surface.

39. The eating utensil as recited in claim 35, wherein the first and second outer tines have a substantially similar size.

40. The eating utensil as recited in claim 35 wherein when the eating utensil is viewed from a side with the concave fork bowl portion facing up and a visible side edge of the handle extending horizontally, a visible one of the outer edges of the fork head does not dip below the visible side edge of the handle.

41. The eating utensil as recited in claim 35, wherein:
the handle has side edges that connect the front surface of the handle to a back surface of the handle and the side edges of the handle are substantially parallel over a majority of a length of the handle; and
each of the outer tines has an inner surface that is substantially longitudinally in-line with the handle and root gaps between adjacent tines are fully rounded.

42. An eating utensil, comprising:
a fork head including a plurality of tines and a concave fork bowl portion, the plurality of tines including first and second outer tines and two inner tines positioned laterally between the first and second outer tines, the first outer tine further including a first outer tine edge that is part of a corresponding smooth first curved outer edge of the fork head and the second outer tine further including a second outer tine edge that is part of a corresponding second curved outer edge of the fork head;
a handle integrally formed with the fork head at a first end of the handle, wherein a front surface of the eating utensil includes a concave surface of the concave fork bowl portion, and a front surface of the handle; and
a tapered surface on a front surface of the fork head that extends laterally inward from the smooth first curved outer edges of the fork head such that at least portions of the smooth first curved outer edge of the fork head acts as a splitting feature, and wherein a maximum width of the tapered surface is less than a maximum width of the first outer tine.

43. The eating utensil as recited in claim 42, wherein the tapered surface extends along the first outer edge of the fork head from a tip of the first outer tine proximally beyond a proximal base of the first outer tine.

44. The eating utensil as recited in claim 43, wherein the tapered surface extends proximally beyond a laterally widest portion of the fork head.

45. The eating utensil as recited in claim 42, wherein the eating utensil is formed of a glass reinforced thermoplastic material.

46. The eating utensil as recited in claim 42 wherein the eating utensil is formed from a glass filled nylon.

47. The eating utensil as recited in claim 42, wherein the chamfered surface extends proximally to a point where the handle portion meets the fork head portion.

48. The eating utensil as recited in claim 42, wherein:
each of the tines has a proximal base end and a distal tip;
the base ends of outer tines are substantially the same width and are wider than the base ends of inner tines.

49. The eating utensil as recited in claim 42, wherein the handle has side edges that connect the front surface of the handle to a back surface of the handle and the side edges of the handle are substantially parallel over a majority of a length of the handle.

50. The eating utensil as recited in claim 42 wherein when the eating utensil is viewed from a side with the concave fork bowl portion facing up and a visible side edge of the handle extending horizontally, a visible one of the outer edges of the fork head does not dip below the visible side edge of the handle.

51. An eating utensil comprising:
a fork head including a plurality of tines and a concave fork bowl portion, the plurality of tines including first and second outer tines and two inner tines positioned laterally between the first and second outer tines;
the first outer tine having (i) a first proximal base, (ii) a first curved outer tine edge that is part of a corresponding first outer edge of the fork head, and (iii) a first tapered surface extending laterally inward from the first outer tine edge of the first outer tine;
the second outer tine having (iv) a second proximal base, (v) a second curved outer tine edge that is part of a corresponding second outer edge of the fork head, and (vi) a second tapered surface extending laterally inward from the second outer tine edge of the second outer tine, and wherein the second outer tine is substantially the same size as the first outer tine;
a handle integrally formed with the fork head at a first end of the handle, the handle having side edges that connect a front surface of the handle to a back surface of the handle, wherein a front surface of the eating utensil includes a concave surface of the concave fork bowl portion, and the front surface of the handle; and
wherein the first and second tapered surfaces are each on the front surface of the eating utensil;
wherein the first tapered surface extends along the first outer edge of the fork head from a tip of the first outer tine proximally towards the handle beyond the first proximal base such that the first curved outer tine edge acts as a first splitting feature that extends proximally beyond a laterally widest portion of the fork head, the first curved outer tine edge being smooth;
wherein the second tapered surface extends along the second outer edge of the fork head from the tip of the first outer tine proximally towards the handle beyond the second proximal base such that the second curved outer tine edge acts as a second splitting feature that extends proximally beyond the laterally widest portion of the fork head; and
wherein when the eating utensil is viewed from a side with the concave fork bowl portion facing up and a visible one of the side edges of the handle extending horizontally, the outer edges of the fork head do not dip below the visible side edge of the handle.

52. The eating utensil as recited in claim 51 wherein the eating utensil is formed from a glass filled nylon.

53. An eating utensil comprising:

a fork head including a plurality of tines and a concave fork bowl portion, the plurality of tines including first and second outer tines and at least one inner tine positioned laterally between the first and second outer tines, the first outer tine having a first proximal base and the second outer tine having a second proximal base and wherein (i) a first edge of the fork head that extends along a first edge of the first outer tine and a first edge of the fork bowl portion is curved and (ii) a second edge of the fork head extending along a second edge of the second outer tine and a second edge of the fork bowl portion is curved;

a handle integrally formed with the fork head at a first end of the handle, wherein a front surface of the eating utensil includes a concave surface of the concave fork bowl portion, and a front surface of the handle;

a first chamfered surface that extends laterally inward from the first edge of the fork head into a front surface of the first tine and the concave fork bowl portion to form a first curved, chamfered splitting feature along the first edge of the fork head; and a second chamfered surface that extends laterally inward from the second edge of the fork head into a front surface of the second tine and the concave fork bowl portion to form a second curved, chamfered splitting feature along the second edge of the fork head.

54. The eating utensil as recited in claim 53, wherein the eating utensil is formed from one of:

a glass reinforced thermoplastic material; and a glass filled nylon.

* * * * *